(12) United States Patent
Kim et al.

(10) Patent No.: US 11,760,153 B2
(45) Date of Patent: Sep. 19, 2023

(54) HEAT PUMP SYSTEM FOR VEHICLE

(71) Applicants: Hyundai Motor Company, Seoul (KR); Kia Corporation, Seoul (KR)

(72) Inventors: Jae Yeon Kim, Hwaseong-si (KR); Yeonho Kim, Seoul (KR); Hochan An, Hwaseong-si (KR); Jeawan Kim, Gwangmyeon-si (KR); Yunho Hwang, Ellicott City, MD (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 34 days.

(21) Appl. No.: 17/514,241

(22) Filed: Oct. 29, 2021

(65) Prior Publication Data
US 2022/0324286 A1 Oct. 13, 2022

(30) Foreign Application Priority Data

Apr. 7, 2021 (KR) .................. 10-2021-0045211

(51) Int. Cl.
*B60H 3/00* (2006.01)
*B60H 1/00* (2006.01)
*B60H 1/14* (2006.01)

(52) U.S. Cl.
CPC ..... *B60H 1/00278* (2013.01); *B60H 1/00921* (2013.01); *B60H 1/143* (2013.01); *B60H 2001/00307* (2013.01); *B60H 2001/00928* (2013.01); *B60H 2001/00949* (2013.01)

(58) Field of Classification Search
CPC ............ B60H 1/00278; B60H 1/00921; B60H 1/143; B60H 2001/00307; B60H 2001/00928; B60H 2001/00949
USPC .......................................................... 165/41
See application file for complete search history.

(56) References Cited

U.S. PATENT DOCUMENTS 11,325,443 B2 * 5/2022 Kim .................. B60H 1/00921

FOREIGN PATENT DOCUMENTS

CN 112339523 A * 2/2021

* cited by examiner

*Primary Examiner* — Davis D Hwu
(74) *Attorney, Agent, or Firm* — MORGAN, LEWIS & BOCKIUS LLP

(57) ABSTRACT

A heat pump system for a vehicle utilizes one chiller in which a coolant and a refrigerant are heat-exchanged to adjust a temperature of a battery module, and utilizes a sub-CE module (sub-centralized energy module) with waste heat of an electrical component in a heating mode of the vehicle to improve heating efficiency.

20 Claims, 10 Drawing Sheets

HEAT PUMP SYSTEM FOR VEHICLE

CROSS-REFERENCE TO RELATED APPLICATION

The present application claims priority to Korean Patent Application No. 10-2021-0045211 filed on Apr. 7, 2021, the entire contents of which is incorporated herein for all purposes by this reference.

BACKGROUND OF THE INVENTION

Field of the Invention

The present invention relates to a vehicle heat pump system for a vehicle. More, to a heat pump system for adjusting a temperature of a battery module by use of one chiller in which a refrigerant and a coolant exchange heat, reducing a manufacturing cost, and improving heating performance.

Description of Related Art

In general, an air conditioning system for a vehicle includes an air conditioner system for circulating a coolant or a refrigerant to heat or cool an interior of the vehicle.

Such an air conditioner, which can maintain a fresh indoor condition by maintaining an indoor temperature of a vehicle at an appropriate temperature regardless of an external temperature change, is configured to heat or cool an interior of the vehicle by heat-exchange by a condenser and an evaporator during a process in which a refrigerant discharged by driving a compressor is circulated to the compressor again by passing through a condenser, a receiver drier, an expansion valve, and the evaporator.

That is, in the air conditioner, a high-temperature and high-pressure gaseous refrigerant which is compressed by the compressor is condensed through the condenser, then is evaporated by the evaporator through the receiver drier and the expansion valve to lower the indoor temperature and humidity in cooling mode.

Recently, as a concern about energy efficiency and environmental pollution has gradually increased, development of an environment-friendly vehicle capable of being substantially substituted for a vehicle having an internal combustion engine has been required, and the environment-friendly vehicles are typically classified into an electric vehicle which is typically driven using a fuel cell or electricity as a power source, and a hybrid vehicle which is driven using an engine and an electric battery.

In the electric vehicle and the hybrid vehicle of the environment-friendly vehicles, a separate heater is not used, unlike an air conditioner of a general vehicle, and an air conditioner, which is applied to the environment-friendly vehicle, is typically referred to as a heat pump system.

In a case of the electric vehicle using the fuel cell, chemical reaction energy of oxygen and hydrogen is converted into electrical energy to generate driving force, and during the present process, thermal energy is generated by chemical reaction in the fuel cell, and as a result, effective removal of the generated heat is required to secure the performance of the fuel cell.

Even in the hybrid vehicle, the driving force is generated by driving the motor by use of electricity supplied from the fuel cell or the electric battery together with the engine which is actuated with a general fuel, and as a result, the performance of the motor may be secured only by effectively removing the heat generated from the fuel cell or the battery, and the motor.

Accordingly, in a hybrid vehicle or electric vehicle of a related art, a battery cooling system, a cooling portion, and a heat pump system may be configured to have respective separate circuits to prevent heat generation of a motor, an electrical component, and a battery including a fuel cell.

Thus, a size and a weight of a cooling module disposed in the front of the vehicle are increased, and a layout of connecting pipes for supplying a refrigerant or coolant to the heat pump system, the cooling device, and the battery cooling system inside an engine compartment becomes complicated.

Furthermore, since the battery cooling system for heating or cooling the battery is separately provided according to a state of the vehicle so that the battery may operate in an optimal state, a plurality of valves for connecting the respective connecting pipes are applied, thus noise and vibration are transmitted to the interior of the vehicle, resulting in poor ride comfort.

Furthermore, when heating a vehicle interior, there are disadvantages such as a decrease in heating performance due to a lack of a heat source, an increase in electricity consumption due to the use of an electric heater, and an increase in power consumption of the compressor.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a heat pump system for a vehicle, which adjusts a temperature of a battery module by use of one chiller where a coolant and a refrigerant exchange heat, and improving heating performance by use of a sub-centralized energy module together with waste heat of an electrical component in a heating mode of the vehicle.

Various aspects of the present invention are directed to providing a heat pump system for a vehicle, including: an air conditioner fluidically connected to a first refrigerant line through which a first refrigerant is circulated, and including a first condenser, a first expansion valve, a first evaporator, and a first compressor; a refrigerant connection line connecting a first portion of a first refrigerant line between the first condenser and the first evaporator and a second portion of the first refrigerant line between the first evaporator and the first compressor; a chiller provided on the refrigerant connection line, connected to an electrical component and a battery module through a coolant line, respectively, and heat-exchanging a coolant introduced in the chiller with the first refrigerant; a sub-centralized energy (CE) module including a second evaporator provided in the refrigerant connection line, fluidically connected to the air conditioner through the refrigerant connection line or the first refrigerant line, to adjust a temperature of the first refrigerant by selectively heat-exchanging thermal energy which is generated when condensing and evaporating of a second refrigerant circulating along a second refrigerant line with the first refrigerant; a gas injection unit is provided in the air conditioner to increases a flow rate of the first refrigerant circulating in the first refrigerant line by bypassing a part of the first refrigerant to the first compressor in a heating mode or a low-temperature dehumidification mode of the vehicle; and wherein the chiller and the second evaporator may be disposed in parallel with the first evaporator through the refrigerant connection line.

The sub-CE module may include: a second compressor configured to compress the second refrigerant; a second condenser connected to the second compressor through the second refrigerant line, and configured to condense the compressed second refrigerant supplied from the second compressor by heat-exchanging with the first refrigerant; a sub-expansion valve connected to the second condenser through the second refrigerant line and configured to expand the second refrigerant; and the second evaporator connected to the sub-expansion valve through the second refrigerant line, and configured to evaporate the second refrigerant supplied from the sub-expansion valve by heat-exchanging with the first refrigerant introduced through the first refrigerant line to supply the evaporated second refrigerant to the second compressor.

The first condenser may be detachably coupled to the second condenser and is provided in the first refrigerant line.

The second evaporator may be detachably coupled to the chiller and may be provided in the refrigerant connection line.

The second compressor may be configured integrally with the first compressor.

A second expansion valve may be provided between the chiller and the second evaporator to control a flow of the first refrigerant introducing into the chiller and selectively expand the first refrigerant, and the second expansion valve may be detachably coupled to the chiller and the second evaporator between the chiller and the second evaporator.

The second expansion valve may expand the first refrigerant introduced into the refrigerant connection line and introduces it into the chiller when cooling the battery module by use of a coolant which undergoes heat transfer with the first refrigerant.

The first expansion valve, the second expansion valve, and the sub-expansion valve may each be an electronic expansion valve that selectively expands a refrigerant while controlling a flow of the refrigerant.

The gas injection unit may include: a flash tank provided in the first refrigerant line between the second condenser and the first expansion valve, and configured to separate the first refrigerant that has passed through the first and second condensers into a gaseous refrigerant and a liquid refrigerant and selectively discharge the gaseous refrigerant and the liquid refrigerant; a bypass line connecting the flash tank and the first compressor to selectively supply the first refrigerant of a gaseous state from the flash tank to the first compressor; a valve provided in the bypass line; and a third expansion valve provided between the first condenser and the second condenser and configured to selectively expand the first refrigerant.

The third expansion valve may expand the first refrigerant passing through the first condenser in the heating mode or the low-temperature dehumidification mode of the vehicle.

The third expansion valve may be detachably coupled to the first condenser and the second condenser.

The gas injection unit may include: a plate heat exchanger provided in the first refrigerant line between the first condenser and the first expansion valve; a bypass line including a first end portion connected to the first refrigerant line between the first condenser and the plate heat exchanger and a second end portion connected to the first compressor through the second condenser and the plate heat exchanger; and a third expansion valve provided in the bypass line at a front end portion of the second condenser.

The second condenser may be provided in the bypass line between the first condenser and the plate heat exchanger, and the third expansion valve may expand the first refrigerant flowing into the bypass line through the first condenser in the heating mode or the low-temperature dehumidification mode of the vehicle.

The second compressor may be formed to have a capacity smaller than a capacity of the first compressor.

The chiller and the second evaporator may be disposed in parallel with the first evaporator through the refrigerant connection line.

The gas injection unit may operate simultaneously with the sub-CE module in the heating mode or the low-temperature dehumidification mode of the vehicle.

The first condenser may be connected to a radiator and a heater through a coolant line, and may condense the first refrigerant by heat-exchanging with the coolant introduced therein with the first refrigerant.

The first condenser may supply a coolant having a temperature which is increased while condensing the first refrigerant in the heating mode, the low-temperature dehumidification mode, and a high-temperature dehumidification mode of the vehicle to the heater through the coolant line.

The chiller may be connected to an electrical component and a battery module through the coolant line, and may absorb waste heat of the electrical component while heat-exchanging a coolant introduced therein with the first refrigerant, or supply the low-temperature coolant heat-exchanged with the first refrigerant to the battery module.

The air conditioner may further include an accumulator provided in the first refrigerant line between the first evaporator and the first compressor, and the coolant connection line may connect the first refrigerant line and the accumulator between the first condenser and the first expansion valve so that the first refrigerant passing through the chiller introduces into the first compressor through the accumulator.

The first refrigerant and the second refrigerant may consist of different refrigerants.

As described above, according to the heat pump system for the vehicle according to the exemplary embodiment of the present invention, simplification of the system may be realized, by use of one chiller in which a refrigerant and a coolant are heat-exchanged to control a temperature of a battery module.

Furthermore, according to various exemplary embodiments of the present invention, it is possible to reduce a total amount of refrigerant, and to improve heating performance and efficiency while minimizing use of electric heaters by use of a sub-CE module together with waste heat of electrical components in a heating mode of the vehicle.

Furthermore, according to various exemplary embodiments of the present invention, it is possible to reduce a manufacturing cost by configuring the evaporator applied to the sub-CE module as a single unit which is detachably coupled to the chiller and by configuring the compressor and the condenser of the sub-CE module as a single unit that are detachably coupled to the compressor and the condenser applied to the air conditioner.

Furthermore, according to various exemplary embodiments of the present invention, it is possible to optimize the performance of the battery module by efficiently controlling the temperature of the battery module, and to increase an overall travel distance of the vehicle through efficient management of the battery module.

Furthermore, according to various exemplary embodiments of the present invention, it is possible to maximize heating performance by applying a gas injection unit to increase the flow rate of the refrigerant.

Furthermore, according to various exemplary embodiments of the present invention, the entire system may be simplified to reduce manufacturing cost and weight, and to improve space utilization.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
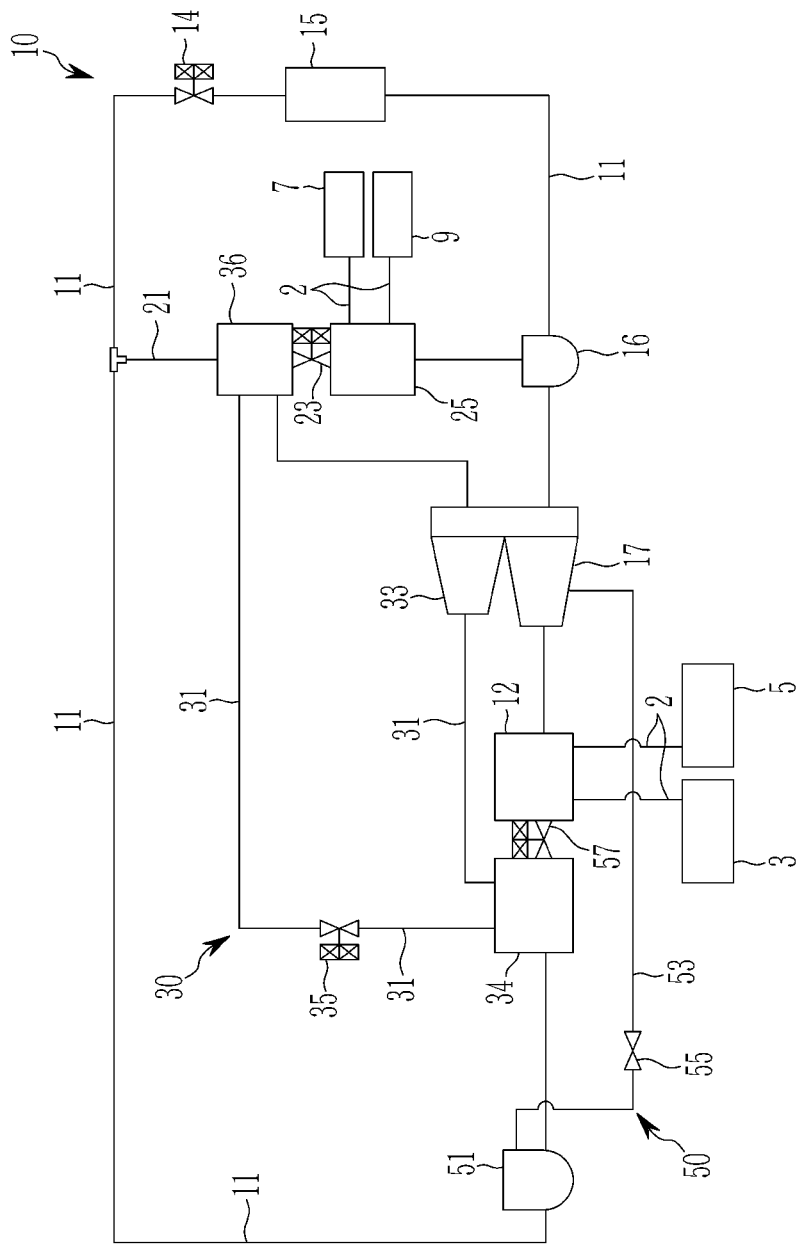
FIG. 1 illustrates a block diagram of a heat pump system for a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Various exemplary embodiments of the present invention will hereinafter be described in detail with reference to the accompanying drawings.

Since the exemplary embodiments described in the specification and the configurations shown in the drawings are merely the most preferable exemplary embodiments and configurations of the present invention, they do not represent all of the technical ideas of the present invention, and it may be understood that various equivalents and modified examples, which may replace the exemplary embodiments of the present invention, are possible, when filing the present application.

To clearly describe the present invention, portions that are irrelevant to the description are omitted, and identical or similar constituent elements throughout the specification are denoted by the same reference numerals.

Since the size and thickness of each configuration shown in the drawings are arbitrarily shown for convenience of description, the present invention is not necessarily limited to configurations illustrated in the drawings, and to clearly illustrate several parts and areas, enlarged thicknesses are shown.

Furthermore, throughout the specification unless explicitly described to the contrary, the word "comprise" and variations such as "comprises" or "comprising" will be understood to imply the inclusion of stated elements but not the exclusion of any other elements.

Furthermore, terms such as " . . . unit", " . . . means", " . . . part", and " . . . member" described in the specification mean a unit of a comprehensive configuration having at least one function or operation.

FIG. 1 illustrates a block diagram of a heat pump system for a vehicle according to various exemplary embodiments of the present invention.

The heat pump system according to the exemplary embodiment of the present invention may adjust a temperature of a battery module 9 by use of a chiller 25 through which a coolant and a refrigerant exchange heat, and may improve heating performance by use of a sub-centralized energy (CE) module 30 together with waste heat of an electrical component 7.

The electrical component 7 may include an electric power control apparatus, an inverter, or an on board charger (OBC). The electric power control apparatus or the inverter may heat up while driving, and the charger may heat up when charging the battery module 9.

Herein, the heat pump system includes an air conditioner 10 which is an air conditioning device configured for cooling or heating a vehicle interior in an electric vehicle, a refrigerant connection line 21, the chiller 25, a sub-CE module 30, and a gas injection unit 50.

In various exemplary embodiments of the present invention, the air conditioner 10 may be connected to each of a radiator 3, a heater 5, the electrical component 7, and the battery module 9 through a coolant line 2. Herein, the heater 5 may be provided inside a heating, ventilation, and air conditioning (HVAC) module.

The air conditioner 10 may be interconnected to a first refrigerant line 11 through which a first refrigerant is circulated, and may include a first condenser 12, a first expansion valve 14, the first evaporator 15, and a first compressor 17.

First, the first condenser 12 is connected to the first refrigerant line 11 to allow the first refrigerant to pass therethrough, and is connected to each of the radiator 3 and the heater 5 through the coolant line 2.

The first condenser 12 may heat-exchange a coolant flowing from the radiator 3 or the heater 5 with the first refrigerant to condense the first refrigerant.

Furthermore, the first condenser 12 may supply a coolant, which has a temperature which is increased while condensing the first refrigerant in a heating mode, a low-temperature dehumidification mode, and a high-temperature dehumidification mode of the vehicle, to the heater 5 through the coolant line 2.

The first condenser 12 which is configured in the instant way may be a water-cooled heat exchanger into which a coolant is introduced.

The first expansion valve 14 may selectively expand the first refrigerant that has passed through the first condenser 12 to introduce it into the first evaporator 15, or control a flow of the first refrigerant to the first evaporator 15.

Herein, the first evaporator 15 is provided inside a non-illustrated heating, ventilation, and air conditioning (HVAC) module connected to the first refrigerant line 11.

The first evaporator 15 may evaporate the first refrigerant through heat exchange with an external air in the cooling mode of the vehicle. The external air cooled while passing through the first evaporator 15 inflows to the vehicle interior to cool the vehicle interior.

The first compressor 17 is connected thereto between the first evaporator 15 and the first condenser 12 through the first refrigerant line 11. The first compressor 17 may compress the first refrigerant of a gaseous state to supply the compressed first refrigerant to the first condenser 12.

In the exemplary embodiment of the present invention, the refrigerant connection line 21 may mutually connect the first refrigerant line 11 between the first condenser 12 and the first evaporator 15, and the first refrigerant line 11 between the first evaporator 15 and the first compressor 17.

The chiller 25 is provided on the refrigerant connection line 21, and is connected to the electrical component 7 and the battery module 9 through the coolant line 2, respectively. The chiller 25 may heat-exchange the introduced coolant with the first refrigerant.

Also, the chiller 25 may heat-exchange the coolant selectively introduced from the electrical component 7 or the battery module 9 with the first refrigerant to control the temperature of the coolant. Herein, the chiller 25 may be the water-cooled heat exchanger in which the coolant is introduced therein.

That is, the chiller 25 may absorb the waste heat of the electrical component 7 while heat-exchanging the introduced coolant with the first refrigerant, or supply the coolant of the low temperature, which undergoes heat transfer with the first refrigerant, to the battery module 9.

Herein, a second expansion valve 23 may be provided in the refrigerant connection line 21 to control a flow of the first refrigerant introducing into the chiller 25 and selectively expand the first refrigerant.

The second expansion valve 23 may expand the first refrigerant introduced into the refrigerant connection line 21 and introduces it into the chiller 25 when cooling the battery module by use of a coolant which undergoes heat transfer with the first refrigerant.

The battery module 9 may be formed as a water-cooled type that supplies power to the electrical equipment 7 and is cooled with the coolant flowing along the coolant line 2.

Accordingly, the low-temperature coolant that has completed heat exchange with the first refrigerant in the chiller 25 may introduce into the battery module 9 which is connected through the coolant line 2, efficiently cooling the battery module 9.

Meanwhile, in various exemplary embodiments of the present invention, the air conditioner 10 may further include an accumulator 16 provided in the first refrigerant line 11 between the first evaporator 15 and the first compressor 17.

On the other hand, the refrigerant connection line 21 may connect the first refrigerant line 11 and the accumulator 16 between the first condenser 12 and the first expansion valve 14 so that the coolant passing through the chiller 25 introduces into the first compressor 17 via the accumulator 16.

The accumulator 16 may selectively receive the first refrigerant discharged from the first evaporator 15 or the first refrigerant passing through the chiller 25 depending on a vehicle mode.

Herein, the accumulator 16 is disposed on the first refrigerant line 11 between the first compressor 17 and the first evaporator 15, and may be connected to the chiller 25 through the refrigerant connection line 21.

The accumulator 16 improves efficiency and durability of the first compressor 17 by supplying only the gaseous refrigerant to the first compressor 17.

In various exemplary embodiments of the present invention, the sub-CE module 30 includes a second condenser 34 provided in the first refrigerant line 11 and a second evaporator 36 provided in the refrigerant connection line 21.

The sub-CE module 30 is connected to the air conditioner 10 through the first refrigerant line 11, and may selectively heat-exchange thermal energy generated during condensation and evaporation of the second refrigerant circulated along a second refrigerant line 31 with the first refrigerant, controlling the temperature of the first refrigerant.

Herein, the sub-CE module 30 includes a second compressor 33, the second condenser 34, a sub-expansion valve 35, and the second evaporator 36 which are connected by the second refrigerant line 31.

First, the second compressor 33 may compress the second refrigerant of a gaseous state to supply the compressed second refrigerant to the second condenser 34.

Herein, the second compressor 33 may have a smaller capacity than that of the first compressor 17. Furthermore, the second compressor 33 may be integrally configured with the first compressor 17.

That is, since a flow rate of the second refrigerant circulating in the sub-CE module 30 is smaller than that of the first refrigerant circulating in the air conditioner 10, the capacity of the second compressor 33 may be smaller than that of the first compressor 17.

Meanwhile, in various exemplary embodiments of the present invention, it is referred to as an exemplary embodiment that the first and second compressors 17 and 33 are integrally configured, but the present invention is not limited thereto, and a single compressor may be used to operate the air conditioner 10 and the sub-CE module 30.

In various exemplary embodiments of the present invention, the second condenser 34 is connected to the second compressor 33 through the second refrigerant line 31. The second condenser 34 may heat-exchange the compressed second refrigerant supplied from the second compressor 33 with the first refrigerant to condense it.

Herein, the first condenser 12 is detachably coupled to the second condenser 34, and is provided in the first refrigerant line 11.

The second condenser 34 configured as described above may be a water-cooled heat exchanger into which each of the first and second refrigerants is introduced.

The sub-expansion valve 35 may selectively expand the second refrigerant that has passed through the second condenser 34 to introduce it into the second evaporator 36, or control a flow of the second refrigerant to the second evaporator 36.

Furthermore, the second evaporator 36 is connected to the sub-expansion valve 35 through the second refrigerant line 31, and is connected to the refrigerant connection line 21.

The second evaporator 36 may evaporate the refrigerant supplied from the second expansion valve 35 through heat exchange with the first refrigerant introduced through the refrigerant connection line 21, to supply the evaporated refrigerant to the second compressor 33.

Herein, the second evaporator 36 may be detachably coupled to the chiller 25, and may be provided in the refrigerant connection line 21.

Furthermore, the chiller 25 and the second evaporator 36 may be disposed in parallel with the first evaporator 15 through the refrigerant connection line 21.

Meanwhile, the second expansion valve 23 is provided between the chiller 25 and the second evaporator 36. The second expansion valve 23 may be detachably coupled to the chiller 25 and the second evaporator 36 between the chiller 25 and the second evaporator 36.

Furthermore, the first refrigerant and the second refrigerant may be formed to include different refrigerants.

For example, the first refrigerant may be an R1234YF or R134a refrigerant, and the second refrigerant may be an R290 refrigerant having a better refrigerant characteristic than the first refrigerant.

The gas injection unit 50 is provided in the air conditioner 10. The gas injection unit 50 may increase the flow rate of the first refrigerant circulating in the first refrigerant line by bypassing some of the first refrigerant, which has passed through the first condenser 12 and the second condenser 34 in the heating mode or the low-temperature dehumidification mode of the vehicle, to the first compressor 17.

The gas injection unit 50 configured as described above may operate simultaneously with the sub-CE module 30 in the heating mode or the low-temperature dehumidification mode of the vehicle.

Conversely, the gas injection unit 50 may stop working together with the sub-CE module 30 in the cooling mode or the high-temperature dehumidification mode of the vehicle.

Herein, the gas injection unit 50 includes a flash tank 51, a bypass line 53, a valve 55, and a third expansion valve 57.

First, the flash tank 51 is provided in the first refrigerant line 11 between the second condenser 34 and the first expansion valve 14.

The flash tank 51 may selectively discharge a gaseous refrigerant and a liquid refrigerant from the first refrigerant that has completed heat exchange while passing through the first and second condensers 12 and 34.

The bypass line 53 connects the flash tank 51 and the first compressor 17. The bypass line 53 may selectively supply the gaseous first refrigerant from the flash tank 51 to the first compressor 17.

That is, the bypass line 53 may connect the flash tank 51 and the first compressor 17 such that the gaseous refrigerant that has passed through the flash tank 51 is selectively introduced into the first compressor 17.

In various exemplary embodiments of the present invention, the valve 55 is provided in the bypass line 53. The valve 55 may selectively open the bypass line 53 depending on the mode of the vehicle.

Herein, the flash tank 51 may supply gaseous refrigerant to the first compressor 17 through the bypass line 53 which is opened through an operation of the valve 55. Furthermore, the flash tank 51 may supply liquid refrigerant to the first evaporator 15, the chiller 25 and the second evaporator 36.

Furthermore, the third expansion valve 57 may be provided between the first condenser 12 and the second condenser 34, to selectively expand the first refrigerant.

Herein, the third expansion valve 57 may selectively expand the first refrigerant that has passed through the first condenser 12 in the heating mode and the low-temperature dehumidification mode of the vehicle to supply it to the second condenser 34.

The third expansion valve 57 may be detachably coupled to the first condenser 12 and the second condenser 34.

That is, the first expansion valve 14, the second expansion valve 23, and the sub-expansion valve 35, and the third expansion valve 57 may be electronic expansion valves that selectively expand the refrigerant while controlling a flow of the refrigerant.

Furthermore, the valve 55 may be two-way valve.

Hereinafter, an operation and function of the heat pump system for a vehicle according to the exemplary embodiment of the present invention configured as described above will be described in detail with reference to FIG. 2 to FIG. 5.

First, an operation when the battery module is cooled depending on the cooling mode in the heat pump system according to the exemplary embodiment of the present invention will be described with reference to FIG. 2.

Figure 2:
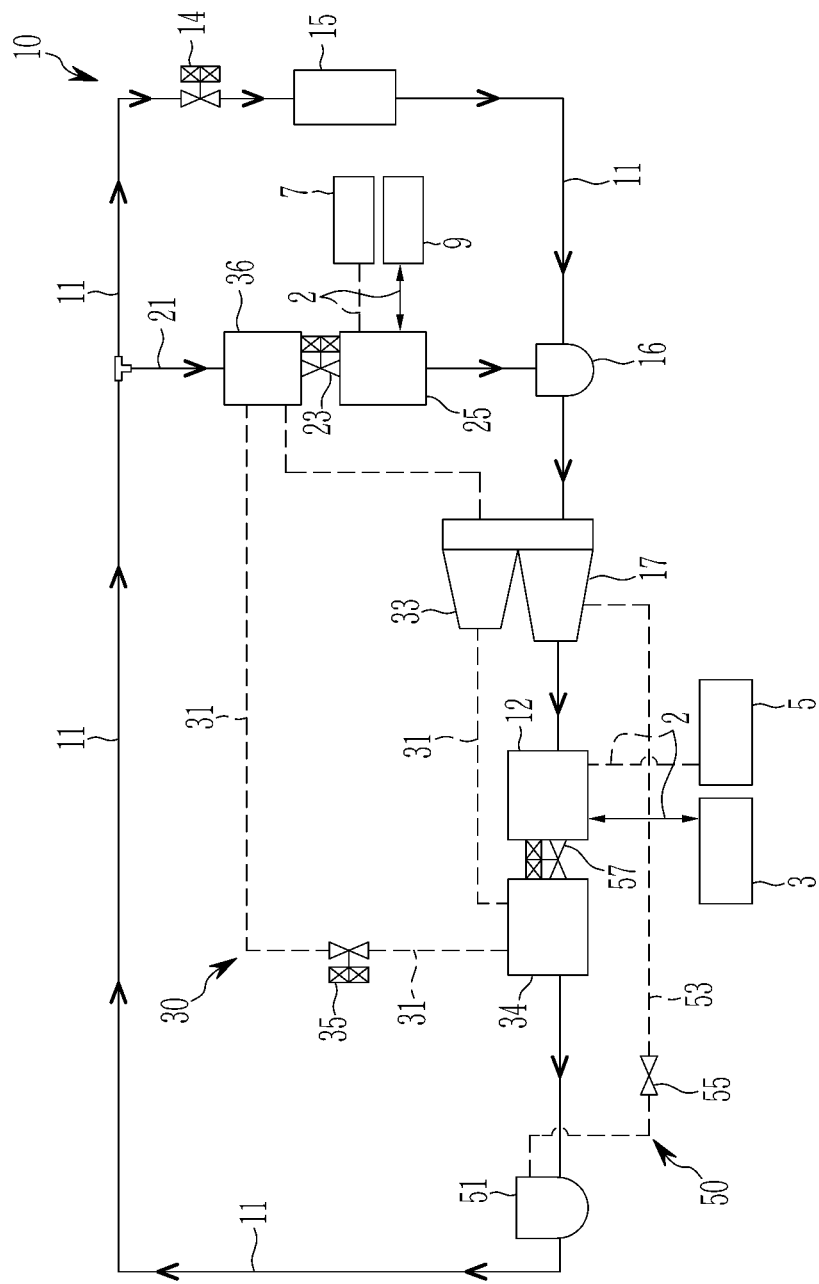
FIG. 2 illustrates an operational state diagram showing a cooling mode of a heat pump system for a vehicle according to various exemplary embodiments of the present invention.

FIG. 2 illustrates an operational state diagram showing a cooling mode of a heat pump system for a vehicle according to various exemplary embodiments of the present invention.

Referring to FIG. 2, in the air conditioner 10, each constituent element operates to cool an interior of the vehicle. Accordingly, the first refrigerant is circulated along the first refrigerant line 11.

Herein, the refrigerant connection line 21 is opened through an operation of the second expansion valve 23.

Meanwhile, the coolant cooled by the radiator 3 is circulated in the first condenser 12 through the coolant line 2.

Furthermore, the coolant line 2 connected to the heater 5 is closed. That is, the coolant cooled by the radiator 3 may be supplied to the first condenser 12 through operation of a water pump.

Accordingly, the first condenser 12 condenses the first refrigerant supplied through the first refrigerant line 11 by use of the coolant flowing along the coolant line 2.

The first refrigerant passing through the first condenser 12 passes through the third expansion valve 57 and the second condenser 34 that are detachably coupled and are integrally configured, and then flows along the first refrigerant line 11.

In the instant case, the third expansion valve 57 may pass the first refrigerant through the second condenser 34 without expanding the first refrigerant.

The first refrigerant flowing along the first refrigerant line 11 is supplied to the first evaporator 15 and the chiller 25 through operation of the first expansion valve 14 and the second expansion valve 23.

Herein, the second expansion valve 23 expands some of the first refrigerant among the first refrigerant so that the expanded first refrigerant is supplied to the chiller 25, and opens the refrigerant connection line 21.

Meanwhile, the coolant is cooled through heat exchange with the first refrigerant supplied to the chiller 25. The coolant cooled by the chiller 25 is supplied to the battery module 9 connected through the coolant line 2. Accordingly, the battery module 9 is cooled by the cooled coolant.

Accordingly, some of the first refrigerant discharged from the first and second condensers 12 and 34 is passed through the second evaporator 36 through operation of the second expansion valve 23 and then is expanded to a low-temperature and low-pressure state, and is introduced into the chiller 25 provided in the refrigerant connection line 21.

Thereafter, the first refrigerant introduced into the chiller 25 is heat exchanged with the coolant, and is introduced into the first compressor 17 through the accumulator 16 connected through the refrigerant connection line 21.

That is, the coolant having the temperature which is raised while cooling the battery module 9 is cooled through the heat exchange with the low-temperature and low-pressure refrigerant inside the chiller 25. The cooled coolant is supplied back to the battery module 9 through the coolant line 2.

As a result, the coolant may efficiently cool the battery module 9 while repeating the above-described operation.

On the other hand, the remaining first refrigerant except the first refrigerant introduced into the refrigerant connection line 21 flows along the first refrigerant line 11 to cool the interior of the vehicle, and sequentially passes through the first expansion valve 14, the first evaporator 15, the accumulator 16, the first compressor 17, the first condenser 12, and the second condenser 34.

Herein, the external air introduced into the HVAC module is cooled while passing through the first evaporator 15 by the first refrigerant of a low temperature state introduced into the first evaporator 15.

The cooled external air directly introduces into the interior of the vehicle, cooling the vehicle interior.

On the other hand, the first refrigerant having an amount of condensation which is increased while passing through the first condenser 12 and the second condenser 34 may be expanded and supplied to the first evaporator 15, allowing the refrigerant to be evaporated to a lower temperature.

As a result, in various exemplary embodiments of the present invention, the first condenser 12 primarily condenses the first refrigerant, and the second condenser 34 further condenses the first refrigerant, advantageously performing sub-cooling of the first refrigerant.

Accordingly, as the first refrigerant having been sub-cooled is evaporated to a lower temperature in the first evaporator 15, the temperature of the coolant exchanged with the first evaporator 15 may be further reduced, improving cooling performance and efficiency.

Meanwhile, the sub-CE module 30 and the gas injection unit 50 stop operating.

That is, the first refrigerant cools the interior of the vehicle in the cooling mode of the vehicle while repeatedly performing the above-described processes, and may simultaneously cool the coolant through heat exchange while passing through the chiller 25.

The coolant cooled in the chiller 25 flows along the coolant line 2, and introduced into the battery module 9. Accordingly, the battery module 9 may be efficiently cooled by the low-temperature coolant supplied to the coolant line 2.

Hereinafter, an operation of the heating mode of the vehicle according to the exemplary embodiment will be described with reference to FIG. 3.

Figure 3:
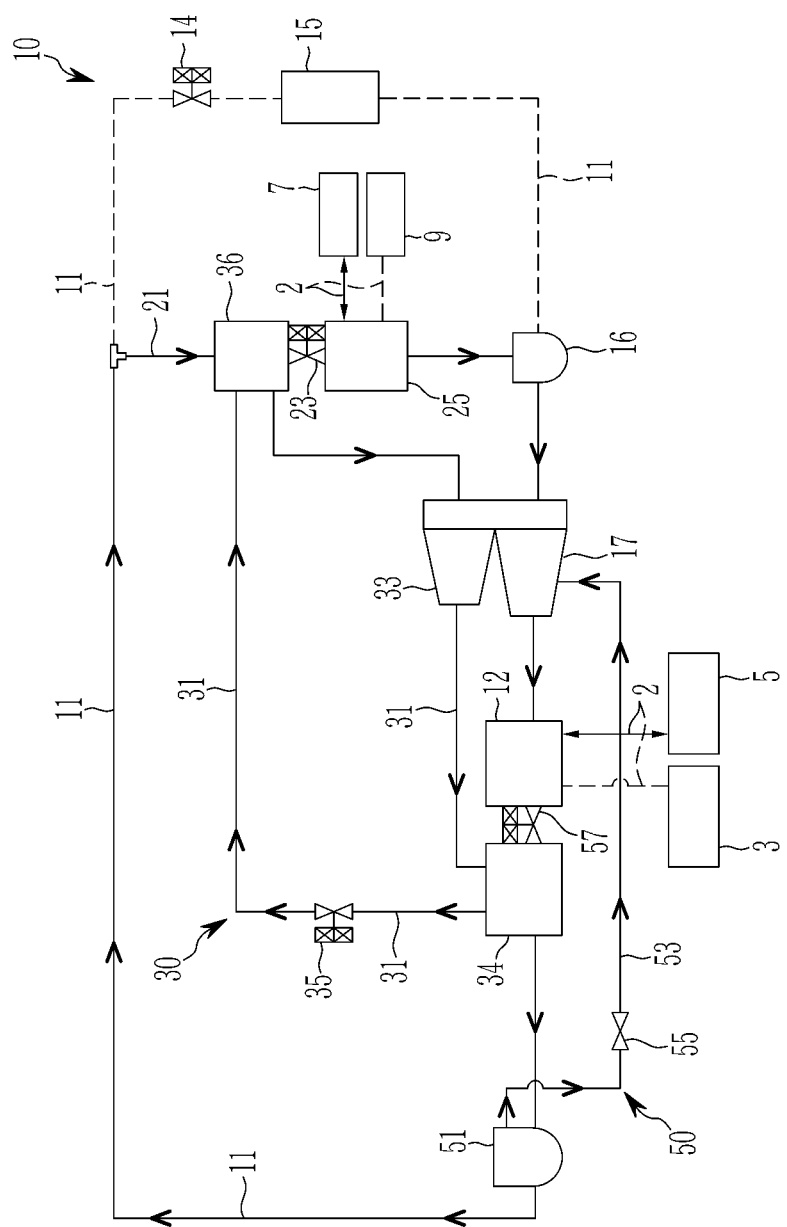
FIG. 3 illustrates an operational state diagram showing a heating mode of a heat pump system for a vehicle according to various exemplary embodiments of the present invention.

FIG. 3 illustrates an operational state diagram showing a heating mode of a heat pump system for a vehicle according to various exemplary embodiments of the present invention.

Referring to FIG. 3, when waste heat of the electrical component 7 is sufficient, the heat pump system may recover the waste heat of the electrical component 7 and use it for indoor heating.

First, in the air conditioner 10, each component operates to heat a vehicle interior, to circulate the first refrigerant along the first refrigerant line 11.

Herein, the first refrigerant line 11 connecting the first and second condensers 12 and 34 and the first evaporator 15 is closed through operation of the first expansion valve 14. The refrigerant connection line 21 connected to the chiller 25 is opened through operation of the second expansion valve 23.

Accordingly, the first refrigerant passing through the first and second condensers 12 and 34 passes through the second evaporator 36 along the refrigerant connection line 21 and is introduced into the second expansion valve 23.

In the instant case, the second expansion valve 23 may expand the first refrigerant to supply it to the chiller 25.

The chiller 25 evaporates the first refrigerant by use of the coolant that flows along the coolant line 2 and has a temperature that has risen while recovering the waste heat of the electrical component 7.

That is, as the coolant introducing into the chiller 25 sufficiently absorbs waste heat from the electrical component 7 and introduces into a high temperature state, the chiller 25 may increase an evaporation amount of the first refrigerant.

Thereafter, the first refrigerant passing through the chiller 25 is supplied to the accumulator 16 along the opened refrigerant connection line 21.

The first refrigerant supplied to the accumulator 16 is separated into a gas and a liquid. Among the first refrigerant separated into the gas and the liquid, the gaseous refrigerant is supplied to the first compressor 17.

The first refrigerant which is compressed in a high-temperature and high-pressure state from the first compressor 17 is introduced into the first condenser 12 and the second condenser 34.

Herein, the first condenser 12 heat-exchanges the coolant supplied through the coolant line 2 connected to the heater 5 with the high-temperature and high-pressure first coolant supplied from the first compressor 17.

The coolant having a temperature which is increased while exchanging heat with the first coolant may be supplied to the heater 5 connected through the coolant line 2. Herein, the coolant line 2 connected to the radiator 3 is closed.

Accordingly, the coolant having a temperature which is increased while passing through the first condenser 12 is supplied to the heater 5 through operation of a water pump.

That is, the external air introduced from the outside thereof passes through the first evaporator 15 to which the first refrigerant is not supplied, it is introduced in an uncooled room temperature state. The introduced external air may be converted into a high temperature state while passing through the heater 5, and introduces into the vehicle, heating the interior of the vehicle.

Meanwhile, the first condenser 12 condenses the first refrigerant supplied through the first refrigerant line 11 by use of the coolant supplied to the coolant line 2 connected to the heater 5.

The first refrigerant passing through the first condenser 12 passes through the third expansion valve 57 and the second condenser 34. Accordingly, the first refrigerant is introduced into the second evaporator 36 and the chiller 25 along the first refrigerant line 11 and the refrigerant connection line 21.

That is, the first refrigerant is supplied to the second evaporator 36 and the chiller 25 along the refrigerant connection line 21 opened through operation of the second expansion valve 23.

Herein, the first refrigerant passing through the chiller 25 flows along the first refrigerant line 11 and the refrigerant connection line 21 to heat the interior of the vehicle, and passes sequentially through the accumulator 16, the first compressor 17, the first condenser 12, and the second condenser 34.

Meanwhile, in the sub-CE module 30, each component is operated such that the second refrigerant is circulated along the second refrigerant line 31. Furthermore, each component may operate in the gas injection unit 50.

Accordingly, the first refrigerant that has passed through the first condenser 12 flows into the second condenser 34 in an expanded state through operation of the third expansion valve 57.

Accordingly, the second condenser 34 condenses the second refrigerant by heat-exchanging the second refrigerant supplied from the second compressor 33 through the second refrigerant line 31 with the first refrigerant expanded from the first condenser 12 while passing through the third expansion valve 57.

The second refrigerant passing through the second condenser 34 is expanded through operation of the second expansion valve 35, and is introduced into the second evaporator 36.

Thereafter, the second refrigerant is evaporated through heat exchange with the first refrigerant introduced along the refrigerant connection line 21 in the second evaporator 36, and is supplied to the second compressor 33 through the second refrigerant line 31.

Meanwhile, the first refrigerant passing through the second condenser 34 is separated into a gas and a liquid in the flash tank 51. In the first refrigerant separated into the gas and the liquid, the gaseous refrigerant is supplied to the first compressor 17 through the bypass line 53 which is opened through operation of the valve 55.

That is, the gas injection unit 50 may increase the flow rate of the first refrigerant circulating in the first refrigerant line 11 by introducing the gaseous refrigerant back into the first compressor 17 through the bypass line 53 in the first refrigerant which is condensed while passing through the first and second condensers 12 and 34.

Accordingly, in the first refrigerant which is separated into the gas and the liquid in the flash tank 51, the liquid refrigerant is further condensed through heat exchange with the second refrigerant while passing through the second evaporator 36.

Accordingly, the first refrigerant passing through the second evaporator 36 is expanded through operation of the second expansion valve 23 and passes through the first evaporator 15 to be introduced into the accumulator 16 connected through the refrigerant connection line 21.

That is, in various exemplary embodiments of the present invention, the first condenser 12 may primarily condense the first refrigerant, and may further condense or evaporate the first refrigerant in the second condenser 34 and the second evaporator 36 by use of the second refrigerant circulating in the sub-CE module 30.

Thereafter, the first refrigerant may be further condensed by heat-exchanging with the second refrigerant in the second evaporator 36, so that the condensation amount of the first refrigerant may be increased.

Furthermore, the first refrigerant having the increased condensation amount may smoothly recover waste heat from the coolant supplied from the electrical component 7 in the chiller 25, improving heating performance and efficiency.

That is, the heat pump system according to the exemplary embodiment may improve heating performance and efficiency while minimizing use of a separate electric heater, by use of thermal energy generated while the second refrigerant is phase-changed in the sub-CE module 30 together with the waste heat of the electrical component 7 in the heating mode of the vehicle.

Furthermore, the gas injection unit 50 increases the flow rate of the first refrigerant, reducing power consumption of the first compressor 17 and maximizing heating performance.

Hereinafter, an operation of the low-temperature dehumidification mode of the vehicle according to the exemplary embodiment will be described with reference to FIG. 4.

Figure 4:
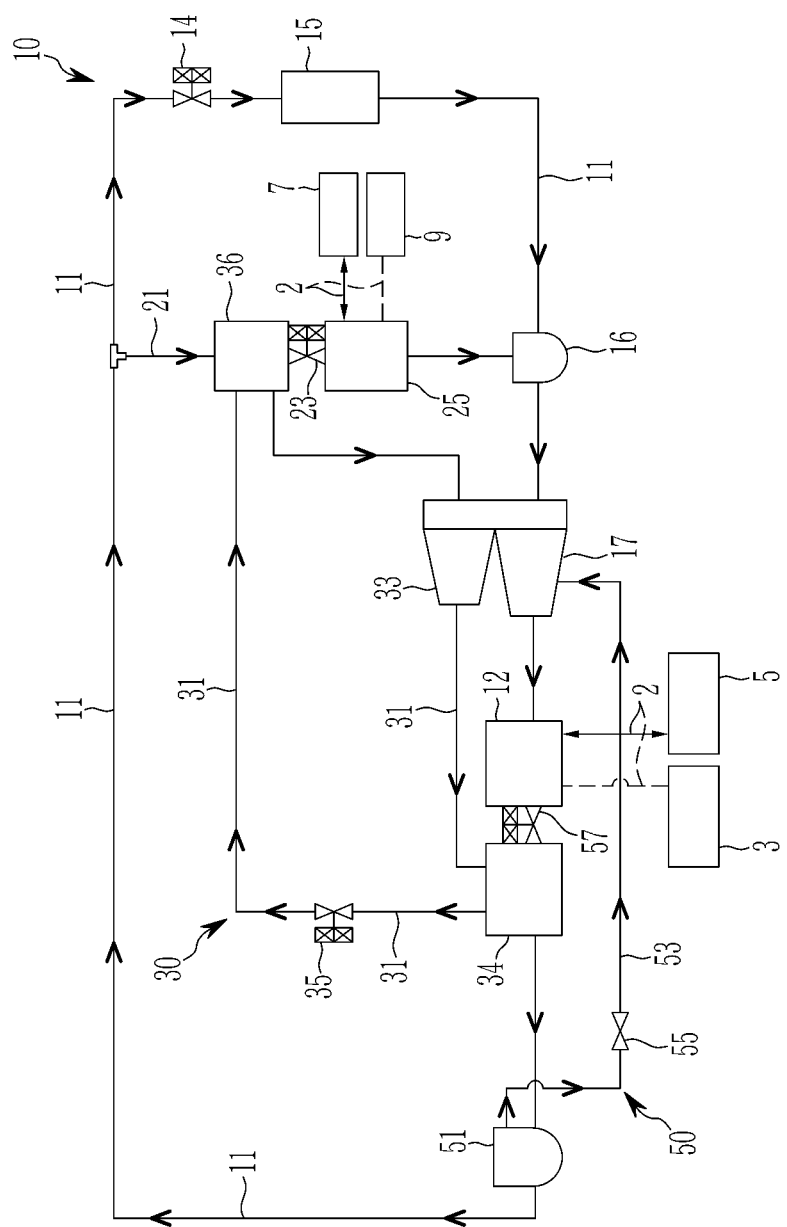
FIG. 4 illustrates an operational state diagram showing a low-temperature dehumidification mode of a heat pump system for a vehicle according to various exemplary embodiments of the present invention.

FIG. 4 illustrates an operational state diagram showing a low-temperature dehumidification mode of a heat pump system for a vehicle according to various exemplary embodiments of the present invention.

Herein, the low-temperature dehumidification mode is a mode which is operated when dehumidification is required in a vehicle interior in the heating mode of the vehicle.

Referring to FIG. 4, when waste heat of the electrical component 7 is sufficient, the heat pump system may recover the waste heat of the electrical component 7 and use it for indoor heating.

First, in the air conditioner 10, each component operates to heat a vehicle interior, to circulate the first refrigerant along the first refrigerant line 11.

Herein, the first refrigerant line 11 connecting the first and second condensers 12 and 34 and the first evaporator 15 is opened through operation of the first expansion valve 14.

Furthermore, the refrigerant connection line 21 connected to the chiller 25 and the second evaporator 36 is opened through operation of the second expansion valve 23. In the instant case, the second expansion valve 23 may expand the first refrigerant to supply it to the chiller 25.

That is, among the first refrigerant that have passed through the first and second condensers 12 and 34, some of the first refrigerant passes through the second evaporator 36. Thereafter, the first refrigerant may be expanded while passing through the second expansion valve 23, and then may be supplied to the chiller 25.

Accordingly, the chiller 25 evaporates the first refrigerant by use of the coolant that flows along the coolant line 2 and has a temperature that has risen while recovering the waste heat of the electrical component 7.

That is, as the coolant introducing into the chiller 25 sufficiently absorbs waste heat from the electrical component 7 and introduces into a high temperature state, the chiller 25 may increase an evaporation amount of the first refrigerant.

Thereafter, the first refrigerant passing through the chiller 25 is supplied to the accumulator 16 along the opened refrigerant connection line 21.

Meanwhile, the first refrigerant line 11 connecting the first and second condensers 12 and 34 and the first evaporator 15, is opened through operation of the first expansion valve 14 to dehumidify the interior of the vehicle.

Accordingly, the remaining first refrigerant passing through the second condenser 34 may be supplied to the first evaporator 15 in the expanded state through operation of the first expansion valve 14 to dehumidify the interior of the vehicle.

Thereafter, the first refrigerant passing through the first evaporator 15 is supplied to the accumulator 16 along the first refrigerant line 11.

The first refrigerant supplied to the accumulator 16 is separated into a gas and a liquid. Among the first refrigerant separated into the gas and the liquid, the gaseous refrigerant is supplied to the first compressor 17.

The first refrigerant which is compressed in a high-temperature and high-pressure state from the first compressor 17 flows into the first condenser 12.

Herein, the first condenser 12 heat-exchanges the coolant supplied through the coolant line 2 connected to the heater 5 with the high-temperature and high-pressure first coolant supplied from the first compressor 17.

The coolant having a temperature which is increased while exchanging heat with the first coolant may be supplied to the heater 5 connected through the coolant line 2. Herein, the coolant line 2 connected to the radiator 3 is closed.

Accordingly, the coolant having a temperature which is increased while passing through the first condenser 12 is supplied to the heater 5 through operation of a water pump.

Meanwhile, the first condenser 12 condenses the first refrigerant supplied through the first refrigerant line 11 by use of the coolant supplied to the coolant line 2 connected to the heater 5.

The first refrigerant passing through the first condenser 12 passes through the third expansion valve 57 and the second condenser 34. Accordingly, the first refrigerant is introduced into the second evaporator 36 and the chiller 25 along the first refrigerant line 11 and the refrigerant connection line 21.

That is, the first refrigerant passing through the first and second condensers 12 and 34 is supplied to the first evaporator 15 and the chiller 15 respectively, along the first refrigerant line 11 and the refrigerant connection line 21 which are opened through operation of the first and second expansion valves 14 and 23.

The first refrigerant flows along the first refrigerant line 11 and the refrigerant connection line 21 to heat and dehumidify the interior of the vehicle, and passes sequentially through the chiller 25, the first evaporator 15, the accumulator 16, the first compressor 17, the first condenser 12, and the second condenser 34.

Meanwhile, in the sub-CE module 30, each component is operated such that the second refrigerant is circulated along the second refrigerant line 31. Furthermore, each component may operate in the gas injection unit 50.

Accordingly, the first refrigerant that has passed through the first condenser 12 flows into the second condenser 34 in an expanded state through operation of the third expansion valve 57.

Accordingly, the second condenser 34 condenses the second refrigerant by heat-exchanging the second refrigerant supplied from the second compressor 33 through the second refrigerant line 31 with the first refrigerant expanded from the first condenser 12 while passing through the third expansion valve 57.

The second refrigerant passing through the second condenser 34 is expanded through operation of the second expansion valve 35, and is introduced into the second evaporator 36.

Thereafter, the second refrigerant is evaporated through heat exchange with the first refrigerant introduced along the refrigerant connection line 21 in the second evaporator 36, and is supplied to the second compressor 33 through the second refrigerant line 31.

Meanwhile, the first refrigerant passing through the second condenser 34 is separated into a gas and a liquid in the flash tank 51. In the first refrigerant separated into the gas and the liquid, the gaseous refrigerant is supplied to the first compressor 17 through the bypass line 53 which is opened through operation of the valve 55.

That is, the gas injection unit 50 may increase the flow rate of the first refrigerant circulating in the first refrigerant line 11 by introducing the gaseous refrigerant back into the first compressor 17 through the bypass line 53 in the first refrigerant which is condensed while passing through the first and second condensers 12 and 34.

Accordingly, in the first refrigerant which is separated into the gas and the liquid in the flash tank 51, the liquid refrigerant is further condensed through heat exchange with the second refrigerant while passing through the second evaporator 36.

Accordingly, the first refrigerant passing through the second evaporator 36 is expanded through operation of the second expansion valve 23 and passes through the first evaporator 15 to be introduced into the accumulator 16 connected through the refrigerant connection line 21.

That is, in various exemplary embodiments of the present invention, the first condenser 12 may primarily condense the first refrigerant, and may further condense or evaporate the first refrigerant in the second condenser 34 and the second evaporator 36 by use of the second refrigerant circulating in the sub-CE module 30.

Thereafter, the first refrigerant may be further condensed by heat-exchanging with the second refrigerant in the second evaporator 36, so that the condensation amount of the first refrigerant may be increased.

Furthermore, the first refrigerant having the increased condensation amount may smoothly recover waste heat from the coolant supplied from the electrical component 7 in the chiller 25, improving heating performance and efficiency.

Meanwhile, the external air introduced from the outside thereof is dehumidified while passing through the first evaporator 15 supplied with the first refrigerant.

The external air which is dehumidified while passing through the first evaporator 15 is converted into a high-temperature state while passing through the heater 5, and is introduced into the vehicle interior, heating and dehumidifying the vehicle interior.

Accordingly, the heat pump system according to the exemplary embodiment may improve heating performance and efficiency while minimizing use of a separate electric heater, by use of thermal energy generated while the second refrigerant is phase-changed in the sub-CE module 30 together with the waste heat of the electrical component 7 in the low-temperature dehumidification mode.

Furthermore, it is possible to reduce power consumption of the first compressor 17, to maximize heating performance, and to supply the first refrigerant expanded to the first evaporator 15 to perform indoor dehumidification together, by facilitating the gas injection unit 50 to increase the flow rate of the first refrigerant.

Hereinafter, an operation of the high-temperature dehumidification mode of the vehicle according to the exemplary embodiment will be described with reference to FIG. 5.

Figure 5:
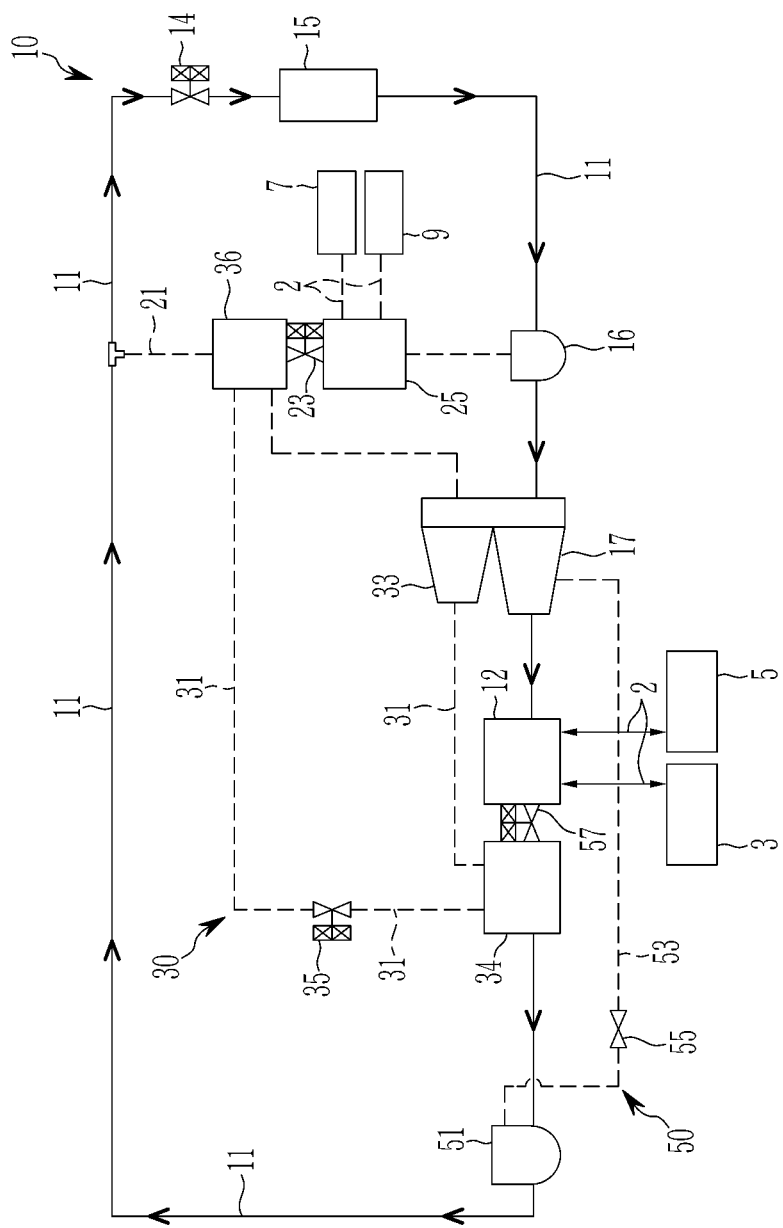
FIG. 5 illustrates an operational state diagram showing a high-temperature dehumidification mode of a heat pump system for a vehicle according to various exemplary embodiments of the present invention.

FIG. 5 illustrates an operational state diagram showing a high-temperature dehumidification mode of a heat pump system for a vehicle according to various exemplary embodiments of the present invention.

Herein, the high-temperature dehumidification mode is a mode which is operated when dehumidification is required in a vehicle interior in the cooling mode of the vehicle.

Referring to FIG. 5, in the air conditioner 10, each constituent element operates to cool an interior of the vehicle. Accordingly, the first refrigerant is circulated along the first refrigerant line 11.

Herein, the refrigerant connection line 21 is closed through operation of the second expansion valve 23.

Meanwhile, the coolant cooled by the radiator 3 is circulated in the first condenser 12 through the coolant line 2. Furthermore, the coolant line 2 connected to the heater 5 is opened.

That is, the coolant cooled by the radiator 3 may be supplied to the first condenser 12 through operation of a water pump.

Accordingly, the first condenser 12 condenses the first refrigerant supplied through the first refrigerant line 11 by use of the coolant flowing along the coolant line 2.

Furthermore, the coolant having a temperature which is increased while condensing the first refrigerant may be supplied to the heater 5 through the coolant line 2 connected to the heater 5.

Meanwhile, the first refrigerant passing through the first condenser 12 passes through the third expansion valve 57 and the second condenser 34 that are detachably coupled and are integrally configured, and then flows along the first refrigerant line 11.

In the instant case, the third expansion valve 57 may pass the first refrigerant through the second condenser 34 without expanding the first refrigerant.

The first refrigerant flowing along the first refrigerant line 11 is supplied to the first evaporator 15 through operation of the first expansion valve 14.

That is, the first refrigerant flows through the first refrigerant line 11 to cool the interior of the vehicle, and passes sequentially through the first expansion valve 14, the first evaporator 15, the accumulator 16, the first compressor 17, the first condenser 12, and the second condenser 34.

Herein, the external air introduced into the HVAC module is cooled while passing through the first evaporator 15 by the first refrigerant of a low temperature state introduced into the first evaporator 15.

The external air cooled while passing through the first evaporator 15 is dehumidified while passing through the heater 5 supplied with the high-temperature coolant from the first condenser 12 and introduced into the vehicle interior, cooling and dehumidifying the vehicle interior.

Meanwhile, the sub-CE module 30 and the gas injection unit 50 stop operating.

That is, depending on the high-temperature dehumidification mode of the vehicle, the interior of the vehicle may be cooled by use of the coolant heat-exchanged with the first refrigerant while repeating the above-described process, and indoor dehumidification may be performed together by supplying the coolant whose temperature is increased through heat exchange with the first refrigerant in the first condenser 12 to the heater 5.

Therefore, as described above, when the vehicle heat pump system according to the exemplary embodiments of the present invention is applied, the chiller 25 in which the coolant and the first refrigerant are heat-exchanged is used to control the temperature of the battery module 9 according to the mode of the vehicle in the electric vehicle, simplifying the system.

Furthermore, according to various exemplary embodiments of the present invention, it is possible to reduce a total amount of refrigerant, and to improve heating performance and efficiency while minimizing use of electric heaters by use of the sub-CE module 30 together with the waste heat of the electrical component 7 in the heating mode of the vehicle.

Furthermore, according to various exemplary embodiments of the present invention, it is possible to reduce a manufacturing cost by configuring the second evaporator 36 applied to the sub-CE module 30 as a single unit which is detachably coupled to the chiller 25, configuring the first compressor 17 applied to the air conditioner 10 integrally with the second compressor 33, and by configuring the first condenser 12 and the second condenser 34 as a single unit which is detachably coupled.

Furthermore, according to various exemplary embodiments of the present invention, it is possible to optimize the performance of the battery module 9 by efficiently controlling the temperature of the battery module 9, and to increase an overall travel distance of the vehicle through efficient management of the battery module 9.

Furthermore, according to various exemplary embodiments of the present invention, it is possible to reduce power consumption of the first compressor 17 and maximize heating performance by applying the gas injection unit 50 to increase the flow rate of the refrigerant.

Furthermore, according to various exemplary embodiments of the present invention, the entire system may be simplified to reduce manufacturing cost and weight, and to improve space utilization.

Meanwhile, a heat pump system for a vehicle according to various exemplary embodiments of the present invention will be described with reference to FIG. 6.

Figure 6:
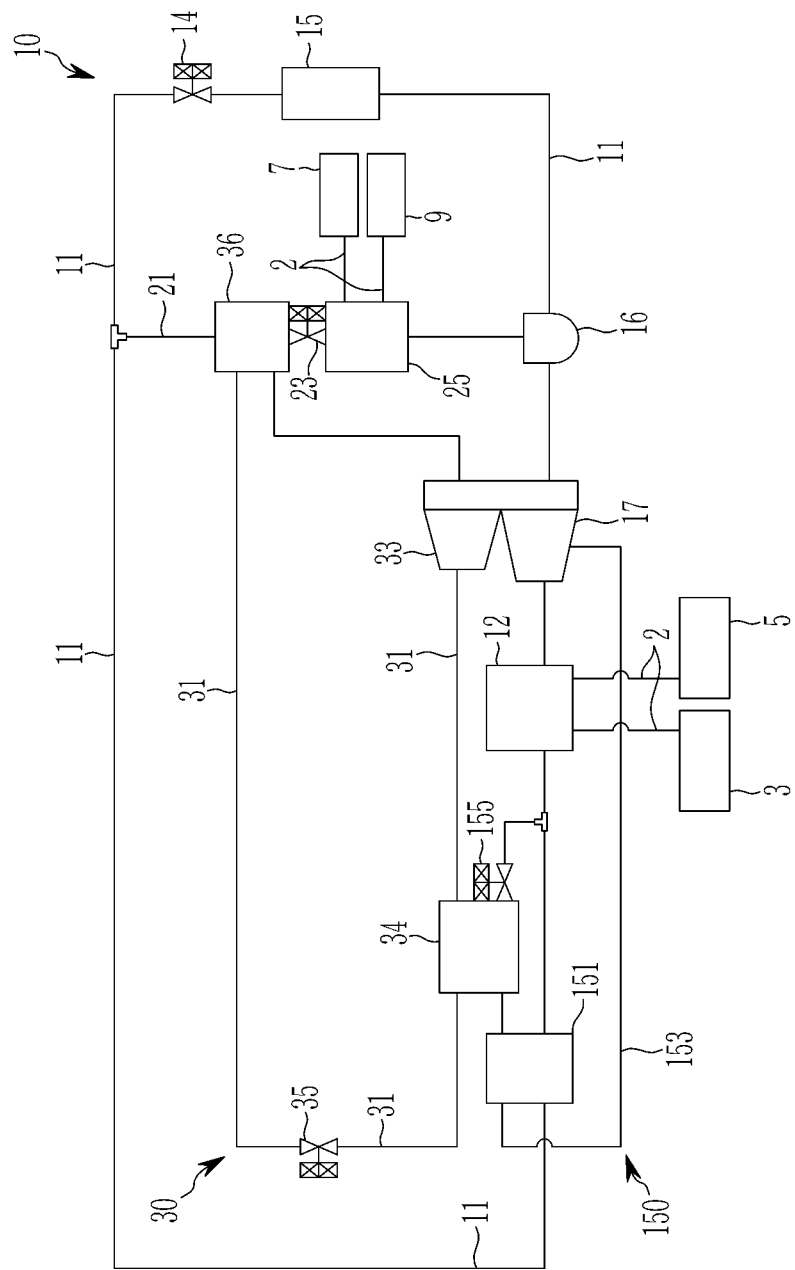
FIG. 6 illustrates a block diagram of a heat pump system for a vehicle according to various exemplary embodiments of the present invention.

FIG. 6 illustrates a block diagram of a heat pump system for a vehicle according to various exemplary embodiments of the present invention.

The heat pump system according to various exemplary embodiments of the present invention may adjust a temperature of a battery module 9 by use of a chiller 25 through which a coolant and a refrigerant exchange heat, and may improve heating performance by use of a sub-centralized energy (CE) module 30 together with waste heat of an electrical component 7.

The electrical component 7 may include an electric power control apparatus, an inverter, or an on board charger (OBC). The electric power control apparatus or the inverter may heat up while driving, and the charger may heat up when charging the battery module 9.

Herein, the heat pump system includes an air conditioner 10 which is an air conditioning device configured for cooling or heating a vehicle interior in an electric vehicle, a refrigerant connection line 21, the chiller 25, a sub-CE module 30, and a gas injection unit 150.

In another exemplary embodiment of the present invention, the air conditioner 10 may be connected to each of a radiator 3, a heater 5, the electrical component 7, and the battery module 9 through a coolant line 2. Herein, the heater 5 may be provided inside a heating, ventilation, and air conditioning (HVAC) module.

The air conditioner 10 may be interconnected to a first refrigerant line 11 through which a first refrigerant is circulated, and may include a first condenser 12, a first expansion valve 14, the first evaporator 15, and a first compressor 17.

First, the first condenser 12 is connected to the first refrigerant line 11 to allow the first refrigerant to pass therethrough, and is connected to each of the radiator 3 and the heater 5 through the coolant line 2.

The first condenser 12 may heat-exchange a coolant flowing from the radiator 3 or the heater 5 with the first refrigerant to condense the first refrigerant.

Furthermore, the first condenser 12 may supply a coolant, which has a temperature which is increased while condensing the first refrigerant in a heating mode, a low-temperature dehumidification mode, and a high-temperature dehumidification mode of the vehicle, to the heater 5 through the coolant line 2.

The first condenser 12 which is configured in the instant way may be a water-cooled heat exchanger into which a coolant is introduced.

The first expansion valve 14 may selectively expand the first refrigerant that has passed through the first condenser 12 to introduce it into the first evaporator 15, or control a flow of the first refrigerant to the first evaporator 15.

Herein, the first evaporator 15 is provided inside a non-illustrated heating, ventilation, and air conditioning (HVAC) module connected to the first refrigerant line 11.

The first evaporator 15 may evaporate the first refrigerant through heat exchange with an external air in the cooling mode of the vehicle. The external air cooled while passing through the first evaporator 15 inflows to the vehicle interior to cool the vehicle interior.

The first compressor 17 is connected thereto between the first evaporator 15 and the first condenser 12 through the first refrigerant line 11. The first compressor 17 may compress the first refrigerant of a gaseous state to supply the compressed first refrigerant to the first condenser 12.

In another exemplary embodiment of the present invention, the refrigerant connection line 21 may mutually connect the first refrigerant line 11 between the first condenser 12 and the first evaporator 15, and the first refrigerant line 11 between the first evaporator 15 and the first compressor 17.

The chiller 25 is provided on the refrigerant connection line 21, and is connected to the electrical component 7 and the battery module 9 through the coolant line 2, respectively. The chiller 25 may heat-exchange the introduced coolant with the first refrigerant.

Also, the chiller 25 may heat-exchange the coolant selectively introduced from the electrical component 7 or the battery module 9 with the first refrigerant to control the temperature of the coolant. Herein, the chiller 25 may be the water-cooled heat exchanger in which the coolant is introduced therein.

That is, the chiller 25 may absorb the waste heat of the electrical component 7 while heat-exchanging the introduced coolant with the first refrigerant, or supply the coolant of the low temperature, which undergoes heat transfer with the first refrigerant, to the battery module 9.

Herein, a second expansion valve 23 may be provided in the refrigerant connection line 21 to control a flow of the first refrigerant introducing into the chiller 25 and selectively expand the first refrigerant.

The second expansion valve 23 may expand the first refrigerant introduced into the refrigerant connection line 21 and introduces it into the chiller 25 when cooling the battery module by use of a coolant which undergoes heat transfer with the first refrigerant.

The battery module 9 may be formed as a water-cooled type that supplies power to the electrical equipment 7 and is cooled with the coolant flowing along the coolant line 2.

Accordingly, the low-temperature coolant that has completed heat exchange with the first refrigerant in the chiller 25 may introduce into the battery module 9 which is connected through the coolant line 2, efficiently cooling the battery module 9.

Meanwhile, in another exemplary embodiment of the present invention, the air conditioner 10 may further include an accumulator 16 provided in the first refrigerant line 11 between the first evaporator 15 and the first compressor 17.

Herein, the refrigerant connection line 21 may connect the first refrigerant line 11 and the accumulator 16 between the first condenser 12 and the first expansion valve 14 so that the coolant passing through the chiller 25 introduces into the first compressor 17 via the accumulator 16.

The accumulator 16 may selectively receive the first refrigerant discharged from the first evaporator 15 or the first refrigerant passing through the chiller 25 depending on a vehicle mode.

Herein, the accumulator 16 is disposed on the first refrigerant line 11 between the first compressor 17 and the first evaporator 15, and may be connected to the chiller 25 through the refrigerant connection line 21.

The accumulator 16 improves efficiency and durability of the first compressor 17 by supplying only the gaseous refrigerant to the first compressor 17.

In another exemplary embodiment of the present invention, the sub-CE module 30 includes a second condenser 34 provided in the first refrigerant line 11 and a second evaporator 36 provided in the refrigerant connection line 21.

The sub-CE module 30 is connected to the air conditioner 10 through the first refrigerant line 11, and may selectively heat-exchange thermal energy generated during condensation and evaporation of the second refrigerant circulated along a second refrigerant line 31 with the first refrigerant, controlling the temperature of the first refrigerant.

Herein, the sub-CE module 30 includes a second compressor 33, the second condenser 34, a sub-expansion valve 35, and the second evaporator 36 which are connected by the second refrigerant line 31.

First, the second compressor 33 may compress the second refrigerant of a gaseous state to supply the compressed second refrigerant to the second condenser 34.

Herein, the second compressor 33 may have a smaller capacity than that of the first compressor 17. Furthermore, the second compressor 33 may be integrally configured with the first compressor 17.

That is, since a flow rate of the second refrigerant circulating in the sub-CE module 30 is smaller than that of the first refrigerant circulating in the air conditioner 10, the capacity of the second compressor 33 may be smaller than that of the first compressor 17.

Meanwhile, in another exemplary embodiment of the present invention, it is referred to as an exemplary embodiment that the first and second compressors 17 and 33 are integrally configured, but the present invention is not limited thereto, and a single compressor may be used to operate the air conditioner 10 and the sub-CE module 30.

In another exemplary embodiment of the present invention, the second condenser 34 is connected to the second compressor 33 through the second refrigerant line 31. The second condenser 34 may heat-exchange the compressed second refrigerant supplied from the second compressor 33 with the first refrigerant to condense it.

Herein, the second condenser 34 according to various exemplary embodiments of the present invention may receive the first refrigerant through the gas injection unit 150.

The second condenser 34 configured as described above may be a water-cooled heat exchanger into which each of the first and second refrigerants is introduced.

The sub-expansion valve 35 may selectively expand the second refrigerant that has passed through the second condenser 34 to introduce it into the second evaporator 36, or control a flow of the second refrigerant to the second evaporator 36.

Furthermore, the second evaporator 36 is connected to the sub-expansion valve 35 through the second refrigerant line 31, and is connected to the refrigerant connection line 21.

The second evaporator 36 may evaporate the refrigerant supplied from the second expansion valve 35 through heat exchange with the first refrigerant introduced through the refrigerant connection line 21, to supply the evaporated refrigerant to the second compressor 33.

Herein, the second evaporator 36 may be detachably coupled to the chiller 25, and may be provided in the refrigerant connection line 21.

Furthermore, the chiller 25 and the second evaporator 36 may be disposed in parallel with the first evaporator 15 through the refrigerant connection line 21.

Meanwhile, the second expansion valve 23 is provided between the chiller 25 and the second evaporator 36. The second expansion valve 23 may be detachably coupled to the chiller 25 and the second evaporator 36 between the chiller 25 and the second evaporator 36.

Furthermore, the first refrigerant and the second refrigerant may be formed to include different refrigerants.

For example, the first refrigerant may be an R1234YF or R134a refrigerant, and the second refrigerant may be an R290 refrigerant having a better refrigerant characteristic than the first refrigerant.

The gas injection unit 150 is provided in the air conditioner 10. The gas injection unit 150 may increase the flow rate of the first refrigerant circulating in the first refrigerant line 11 by bypassing some of the first refrigerant, which has passed through the first condenser 12 in the heating mode or the low-temperature dehumidification mode of the vehicle, to the first compressor 17.

The gas injection unit 150 configured as described above may operate simultaneously with the sub-CE module 30 in the heating mode or the low-temperature dehumidification mode of the vehicle.

Conversely, the gas injection unit 150 may stop working together with the sub-CE module 30 in the cooling mode or the high-temperature dehumidification mode of the vehicle.

Herein, the gas injection unit 150 may include a plate heat exchanger 151, a bypass line 153, and a third expansion valve 155.

First, the plate heat exchanger 151 may be provided in the first refrigerant line 11 between the first condenser 12 and the first expansion valve 14.

A first end portion of the bypass line 153 is connected to the first refrigerant line 11 between the first condenser 12 and the plate heat exchanger 151. A second end portion of the bypass line 153 may extend through the second condenser 34 and the plate heat exchanger 151 to be connected to the first compressor 17.

Herein, the second condenser 34 may be provided in the bypass line 153 between the first condenser 12 and the plate heat exchanger 151.

That is, among the first refrigerant that has passed through the first condenser 12, some of the first refrigerant may flow into the bypass line 153, and the remaining first refrigerant may be introduced into the plate heat exchanger 151 through the first refrigerant line 11.

Furthermore, the third expansion valve 155 may be provided in the bypass line 153 at a front end portion of the second condenser 34.

The third expansion valve 155 may pass through the first condenser 12 in the heating mode and the low-temperature dehumidification mode of the vehicle, and may expand the first refrigerant introducing into the bypass line 153 to supply it to the second condenser 34.

Accordingly, the plate heat exchanger 151 may introduce into the bypass line 153 and expand through operation of the third expansion valve 155 to exchange heat between the first refrigerant passing through the second condenser 34 and the first refrigerant discharged from the first condenser 12.

That is, the bypass line 153 may selectively supply the first refrigerant of a gaseous state to the first compressor 17 in the first refrigerant which undergoes heat transfer while passing through the second condenser 34 and the plate heat exchanger 151.

Herein, the plate heat-exchanger 151 may supply the gaseous refrigerant to the first compressor 17 through the bypass line 153 which is opened through operation of the third expansion valve 155. Furthermore, the plate heat exchanger 151 may supply the liquid refrigerant to the first evaporator 15 and the second evaporator 36.

Meanwhile, in another exemplary embodiment of the present invention, the first expansion valve 14, the second expansion valve 35, and the third expansion valve 155 may be electronic expansion valves that selectively expand the refrigerant while controlling a flow of the refrigerant.

Hereinafter, an operation and function of the heat pump system for a vehicle according to various exemplary embodiments of the present invention configured as described above will be described in detail with reference to FIG. 7 to FIG. 10.

First, an operation when the battery module is cooled depending on the cooling mode in the heat pump system according to various exemplary embodiments of the present invention will be described with reference to FIG. 7.

Figure 7:
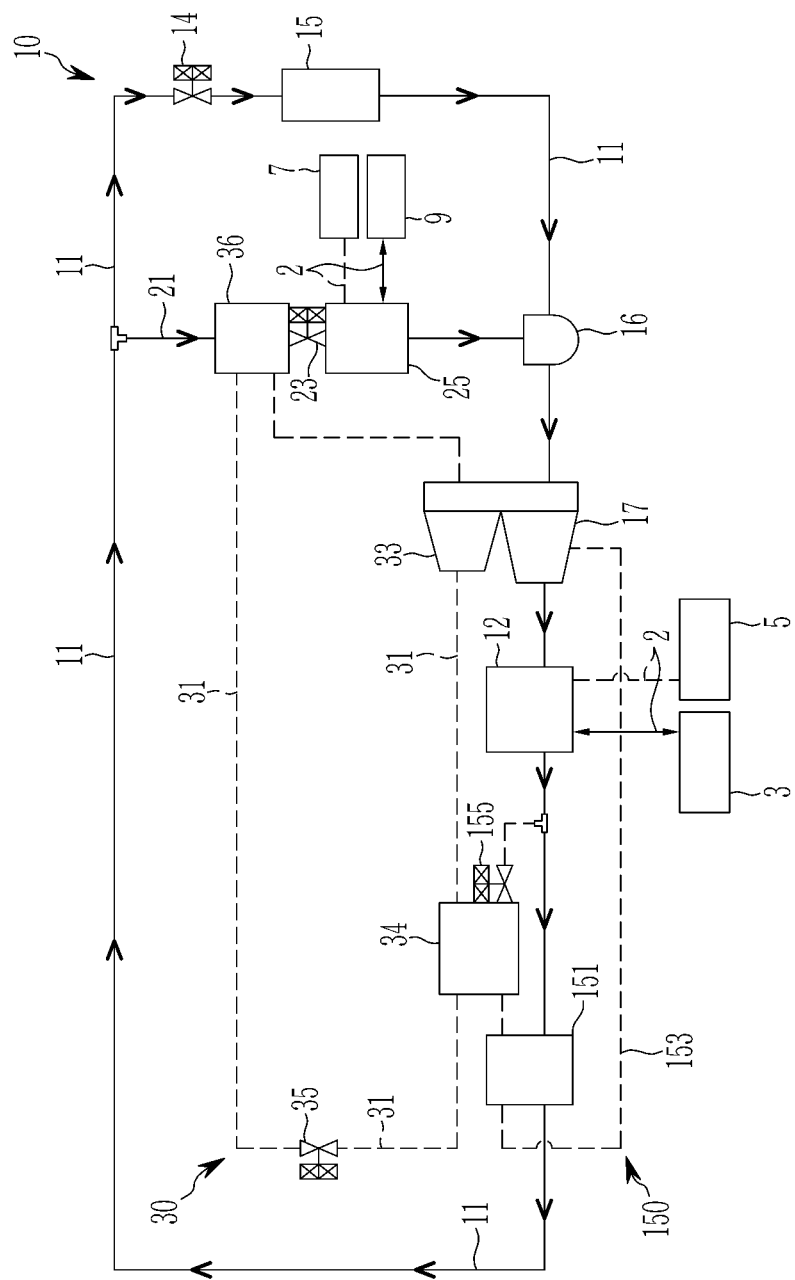
FIG. 7 illustrates an operational state diagram showing a cooling mode of a heat pump system for a vehicle according to various exemplary embodiments of the present invention.

FIG. 7 illustrates an operational state diagram showing a cooling mode of a heat pump system for a vehicle according to various exemplary embodiments of the present invention.

Referring to FIG. 7, in the air conditioner 10, each constituent element operates to cool an interior of the vehicle. Accordingly, the first refrigerant is circulated along the first refrigerant line 11.

Herein, the refrigerant connection line 21 is opened through an operation of the second expansion valve 23.

Meanwhile, the coolant cooled by the radiator 3 is circulated in the first condenser 12 through the coolant line 2. Furthermore, the coolant line 2 connected to the heater 5 is closed.

That is, the coolant cooled by the radiator 3 may be supplied to the first condenser 12 through operation of a water pump.

Accordingly, the first condenser 12 condenses the first refrigerant supplied through the first refrigerant line 11 by use of the coolant flowing along the coolant line 2.

The first refrigerant passing through the first condenser 12 flows along the first refrigerant line 11.

The first refrigerant flowed along the first refrigerant line 11 is supplied to the first evaporator 15 and the chiller 25 respectively, through operation of the first and second expansion valves 14 and 23.

Herein, the second expansion valve 23 expands some of the first refrigerant among the first refrigerant so that the expanded first refrigerant is supplied to the chiller 25, and opens the refrigerant connection line 21.

Meanwhile, the coolant is cooled through heat exchange with the first refrigerant supplied to the chiller 25. The coolant cooled by the chiller 25 is supplied to the battery module 9 connected through the coolant line 2. Accordingly, the battery module 9 is cooled by the cooled coolant.

Accordingly, some of the first refrigerant discharged from the first condenser 12 is passed through the second evaporator 36 through operation of the second expansion valve 23 and then is expanded to a low-temperature and low-pressure state, and is introduced into the chiller 25 provided in the refrigerant connection line 21.

Thereafter, the first refrigerant introduced into the chiller 25 is heat exchanged with the coolant, and is introduced into the first compressor 17 through the accumulator 16 connected through the refrigerant connection line 21.

That is, the coolant having the temperature which is raised while cooling the battery module 9 is cooled through the heat exchange with the low-temperature and low-pressure refrigerant inside the chiller 25. The cooled coolant is supplied back to the battery module 9 through the coolant line 2.

As a result, the coolant may efficiently cool the battery module 9 while repeating the above-described operation.

On the other hand, the remaining first refrigerant except the first refrigerant introduced into the refrigerant connection line 21 flows along the first refrigerant line 11 to cool the interior of the vehicle, and sequentially passes through the first expansion valve 14, the first evaporator 15, the accumulator 16, the first compressor 17, and the first condenser 12.

Herein, the external air introduced into the HVAC module is cooled while passing through the first evaporator 15 by the first refrigerant of a low temperature state introduced into the first evaporator 15.

The cooled external air directly introduces into the interior of the vehicle, cooling the vehicle interior.

Meanwhile, the sub-CE module 30 and the gas injection unit 50 stop operating.

That is, the first refrigerant cools the interior of the vehicle in the cooling mode of the vehicle while repeatedly performing the above-described processes, and may simultaneously cool the coolant through heat exchange while passing through the chiller 25.

The coolant cooled in the chiller 25 flows along the coolant line 2, and introduced into the battery module 9. Accordingly, the battery module 9 may be efficiently cooled by the low-temperature coolant supplied to the coolant line 2.

Hereinafter, an operation depending on the heating mode of the vehicle according to various exemplary embodiments of the present invention will be described with reference to FIG. 8.

Figure 8:
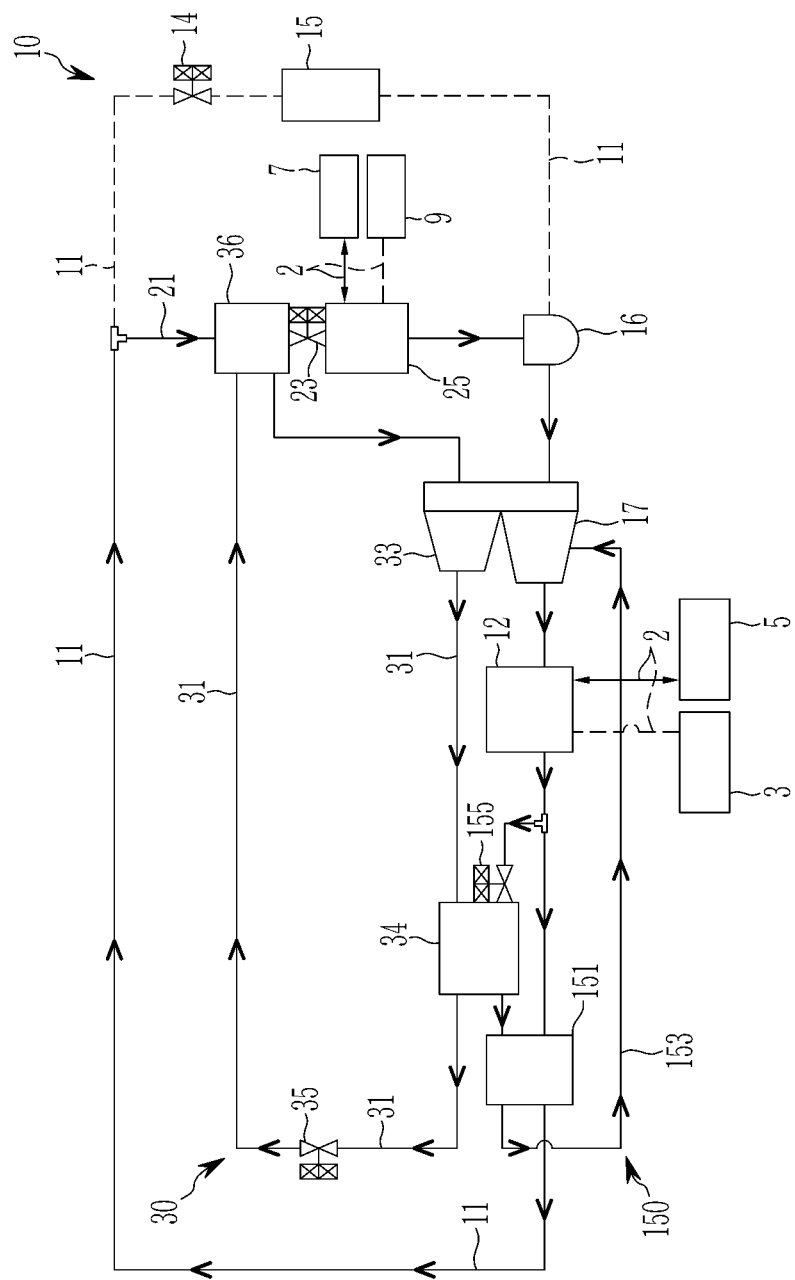
FIG. 8 illustrates an operational state diagram showing a heating mode of a heat pump system for a vehicle according to various exemplary embodiments of the present invention.

FIG. 8 illustrates an operational state diagram showing a heating mode of a heat pump system for a vehicle according to various exemplary embodiments of the present invention.

Referring to FIG. 8, when waste heat of the electrical component 7 is sufficient, the heat pump system may recover the waste heat of the electrical component 7 and use it for indoor heating.

First, in the air conditioner 10, each component operates to heat a vehicle interior, to circulate the first refrigerant along the first refrigerant line 11.

Herein, the first refrigerant line 11 connecting the first condenser 12 and the first evaporator 15 is closed through operation of the first expansion valve 14. The refrigerant connection line 21 connected to the chiller 25 is opened through operation of the second expansion valve 23.

Accordingly, the first refrigerant passing through the first condenser 12 passes through the second evaporator 36 along the refrigerant connection line 21 and is introduced into the second expansion valve 23.

In the instant case, the second expansion valve 23 may expand the first refrigerant to supply it to the chiller 25.

The chiller 25 evaporates the first refrigerant by use of the coolant that flows along the coolant line 2 and has a temperature that has risen while recovering the waste heat of the electrical component 7.

That is, as the coolant introducing into the chiller 25 sufficiently absorbs waste heat from the electrical component 7 and introduces into a high temperature state, the chiller 25 may increase an evaporation amount of the first refrigerant.

Thereafter, the first refrigerant passing through the chiller 25 is supplied to the accumulator 16 along the opened refrigerant connection line 21.

The first refrigerant supplied to the accumulator 16 is separated into a gas and a liquid. Among the first refrigerant separated into the gas and the liquid, the gaseous refrigerant is supplied to the first compressor 17.

The first refrigerant which is compressed in a high-temperature and high-pressure state from the first compressor 17 is introduced into the first condenser 12 and the second condenser 34.

Herein, the first condenser 12 heat-exchanges the coolant supplied through the coolant line 2 connected to the heater 5 with the high-temperature and high-pressure first coolant supplied from the first compressor 17.

The coolant having a temperature which is increased while exchanging heat with the first coolant may be supplied to the heater 5 connected through the coolant line 2. Herein, the coolant line 2 connected to the radiator 3 is closed.

Accordingly, the coolant having a temperature which is increased while passing through the first condenser 12 is supplied to the heater 5 through operation of a water pump.

That is, the external air introduced from the outside thereof passes through the first evaporator 15 to which the first refrigerant is not supplied, it is introduced in an uncooled room temperature state. The introduced external air may be converted into a high temperature state while passing through the heater 5, and introduces into the vehicle, heating the interior of the vehicle.

Meanwhile, the first condenser 12 condenses the first refrigerant supplied through the first refrigerant line 11 by use of the coolant supplied to the coolant line 2 connected to the heater 5.

The first refrigerant passing through the first condenser 12 is introduced into the second evaporator 36 and the chiller 25 along the first refrigerant line 11 and the refrigerant connection line 21.

That is, the first refrigerant is supplied to the second evaporator 36 and the chiller 25 along the refrigerant connection line 21 opened through operation of the second expansion valve 23.

Herein, the first refrigerant passing through the chiller 25 flows along the first refrigerant line 11 and the refrigerant connection line 21 to heat the interior of the vehicle, and passes sequentially through the accumulator 16, the first compressor 17, and the first condenser 12.

Meanwhile, in the sub-CE module 30, each component is operated such that the second refrigerant is circulated along the second refrigerant line 31. Furthermore, each component may operate in the gas injection unit 150.

Accordingly, among the first refrigerant that has passed through the first condenser 12, some of the first refrigerant is introduced into the bypass line 153 opened through operation of the third expansion valve 155.

The first refrigerant introduced into the bypass line 153 is introduced into the second condenser 34 in an expanded state through operation of the third expansion valve 155.

Accordingly, the second condenser 34 condenses the second refrigerant by heat-exchanging the second refrigerant supplied from the second compressor 33 through the second refrigerant line 31 with the first refrigerant expanded from the bypass line 153 while passing through the third expansion valve 155.

The second refrigerant passing through the second condenser 34 is expanded through operation of the second expansion valve 35, and is introduced into the second evaporator 36.

Thereafter, the second refrigerant is evaporated through heat exchange with the first refrigerant passing through the plate heat exchanger 151 in the second evaporator 36, and is supplied to the second compressor 33 through the second refrigerant line 31.

Meanwhile, the first refrigerant passing through the second condenser 34 enters a gaseous state while heat exchanging with the remaining first refrigerant introduced from the first condenser 12 through the first refrigerant line 11 in the plate heat exchanger 151.

The first refrigerant of a gaseous state is supplied to the first compressor 17 through the opened bypass line 153.

That is, the gas injection unit 150 may increase the flow rate of the first refrigerant circulating in the first refrigerant line 11 by introducing the first refrigerant of a gaseous state which undergoes heat transfer while passing through each of the first and second condensers 12 and 34 and the plate heat exchanger 151, back into the first compressor 17 through the bypass line 153.

Accordingly, the first refrigerant discharged from the plate heat exchanger 151 through the first refrigerant line 11 is further condensed while passing through the second evaporator 36.

That is, in another exemplary embodiment of the present invention, the first condenser 12 may primarily condense the first refrigerant, and may further condense or evaporate the first refrigerant in the second condenser 34 and the second evaporator 36 by use of the second refrigerant circulating in the sub-CE module 30.

Furthermore, in the gas injection unit 150, the plate heat exchanger 151 may heat exchange between the first refrigerant introduced through the bypass line 153 and the first refrigerant introduced through the first refrigerant line 11, and may bypass the first refrigerant of a gaseous state to the first compressor 17 through the bypass line 151.

Accordingly, a condensation amount of the first refrigerant may be increased.

Furthermore, the first refrigerant having the increased condensation amount may smoothly recover waste heat from the coolant supplied from the electrical component 7 in the chiller 25, improving heating performance and efficiency.

That is, the heat pump system according to the exemplary embodiment may improve heating performance and efficiency while minimizing use of a separate electric heater, by use of thermal energy generated while the second refrigerant is phase-changed in the sub-CE module 30 together with the waste heat of the electrical component 7 in the heating mode of the vehicle.

Furthermore, the gas injection unit 150 increases the flow rate of the first refrigerant, maximizing heating performance.

Hereinafter, an operation depending on the low-temperature dehumidification mode of the vehicle according to various exemplary embodiments of the present invention will be described with reference to FIG. 9.

Figure 9:
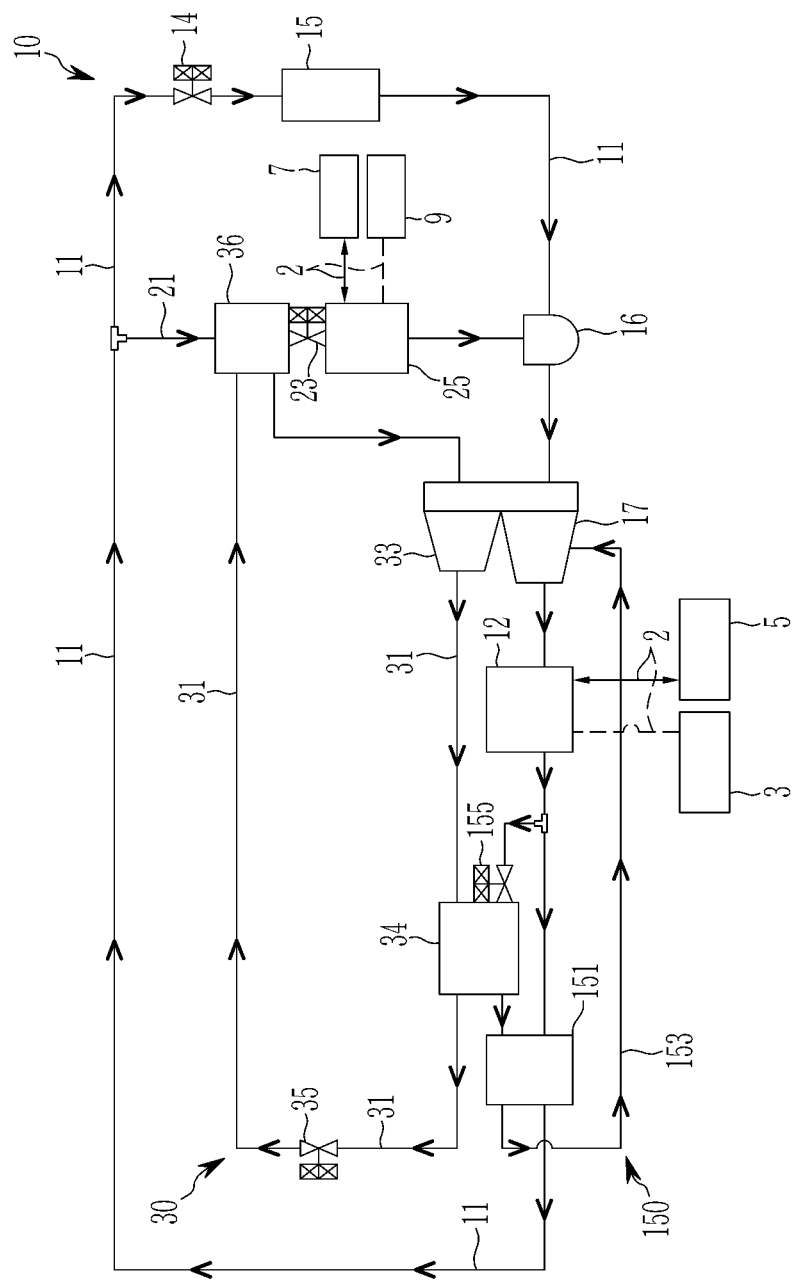
FIG. 9 illustrates an operational state diagram showing a low-temperature dehumidification mode of a heat pump system for a vehicle according to various exemplary embodiments of the present invention.

FIG. 9 illustrates an operational state diagram showing a low-temperature dehumidification mode of a heat pump system for a vehicle according to various exemplary embodiments of the present invention.

Herein, the low-temperature dehumidification mode is a mode which is operated when dehumidification is required in a vehicle interior in the heating mode of the vehicle.

Referring to FIG. 9, when waste heat of the electrical component 7 is sufficient, the heat pump system may recover the waste heat of the electrical component 7 and use it for indoor heating.

First, in the air conditioner 10, each component operates to heat a vehicle interior, to circulate the first refrigerant along the first refrigerant line 11.

Herein, the first refrigerant line 11 connecting the first and second condensers 12 and 34 and the first evaporator 15 is opened through operation of the first expansion valve 14.

Furthermore, the refrigerant connection line 21 connected to the chiller 25 and the second evaporator 36 is opened through operation of the second expansion valve 23. In the instant case, the second expansion valve 23 may expand the first refrigerant to supply it to the chiller 25.

That is, among the first refrigerant that have passed through the first condenser 12, some of the first refrigerant passes through the second evaporator 36. Thereafter, the first refrigerant may be expanded while passing through the second expansion valve 23, and then may be supplied to the chiller 25.

Accordingly, the chiller 25 evaporates the first refrigerant by use of the coolant that flows along the coolant line 2 and has a temperature that has risen while recovering the waste heat of the electrical component 7.

That is, as the coolant introducing into the chiller 25 sufficiently absorbs waste heat from the electrical component 7 and introduces into a high temperature state, the chiller 25 may increase an evaporation amount of the first refrigerant.

Thereafter, the first refrigerant passing through the chiller 25 is supplied to the accumulator 16 along the opened refrigerant connection line 21.

Meanwhile, the first refrigerant line 11 connecting the first condenser 12 and the first evaporator 15, is opened through operation of the first expansion valve 14 to dehumidify the interior of the vehicle.

Accordingly, the remaining first refrigerant passing through the first condenser 12 may be supplied to the first evaporator 15 in the expanded state through operation of the first expansion valve 14 to dehumidify the interior of the vehicle.

Thereafter, the first refrigerant passing through the first evaporator 15 is supplied to the accumulator 16 along the first refrigerant line 11.

The first refrigerant supplied to the accumulator 16 is separated into a gas and a liquid. Among the first refrigerant separated into the gas and the liquid, the gaseous refrigerant is supplied to the first compressor 17.

The first refrigerant which is compressed in a high-temperature and high-pressure state from the first compressor 17 flows into the first condenser 12.

Herein, the first condenser 12 heat-exchanges the coolant supplied through the coolant line 2 connected to the heater 5 with the high-temperature and high-pressure first coolant supplied from the first compressor 17.

The coolant having a temperature which is increased while exchanging heat with the first coolant may be supplied to the heater 5 connected through the coolant line 2. Herein, the coolant line 2 connected to the radiator 3 is closed.

Accordingly, the coolant having a temperature which is increased while passing through the first condenser 12 is supplied to the heater 5 through operation of a water pump.

Meanwhile, the first condenser 12 condenses the first refrigerant supplied through the first refrigerant line 11 by use of the coolant supplied to the coolant line 2 connected to the heater 5.

That is, the first refrigerant passing through the first and second condensers 12 and 34 is supplied to the first evaporator 15 and the chiller 15 respectively, along the first refrigerant line 11 and the refrigerant connection line 21 which are opened through operation of the first and second expansion valves 14 and 23.

The first refrigerant flows along the first refrigerant line 11 and the refrigerant connection line 21 to heat and dehumidify the interior of the vehicle, and passes sequentially through the chiller 25, the first evaporator 15, the accumulator 16, the first compressor 17, and the first condenser 12.

Meanwhile, in the sub-CE module 30, each component is operated such that the second refrigerant is circulated along the second refrigerant line 31. Furthermore, each component may operate in the gas injection unit 150.

Accordingly, among the first refrigerant that has passed through the first condenser 12, some of the first refrigerant is introduced into the bypass line 153 opened through operation of the third expansion valve 155.

The first refrigerant introduced into the bypass line 153 is introduced into the second condenser 34 in an expanded state through operation of the third expansion valve 155.

Accordingly, the second condenser 34 condenses the second refrigerant by heat-exchanging the second refrigerant supplied from the second compressor 33 through the second refrigerant line 31 with the first refrigerant expanded from the bypass line 153 while passing through the third expansion valve 155.

The second refrigerant passing through the second condenser 34 is expanded through operation of the second expansion valve 35, and is introduced into the second evaporator 36.

Thereafter, the second refrigerant is evaporated through heat exchange with the first refrigerant passing through the plate heat exchanger 151 in the second evaporator 36, and is supplied to the second compressor 33 through the second refrigerant line 31.

Meanwhile, the first refrigerant passing through the second condenser 34 enters a gaseous state while heat exchanging with the remaining first refrigerant introduced from the first condenser 12 through the first refrigerant line 11 in the plate heat exchanger 151.

The first refrigerant of a gaseous state is supplied to the first compressor 17 through the opened bypass line 153.

That is, the gas injection unit 150 may increase the flow rate of the first refrigerant circulating in the first refrigerant line 11 by introducing the first refrigerant of a gaseous state which undergoes heat transfer while passing through each of the first and second condensers 12 and 34 and the plate heat exchanger 151, back into the first compressor 17 through the bypass line 153.

Accordingly, the first refrigerant discharged from the plate heat exchanger 151 through the first refrigerant line 11 is further condensed while passing through the second evaporator 36.

That is, in another exemplary embodiment of the present invention, the first condenser 12 may primarily condense the first refrigerant, and may further condense or evaporate the first refrigerant in the second condenser 34 and the second evaporator 36 by use of the second refrigerant circulating in the sub-CE module 30.

Furthermore, in the gas injection unit 150, the plate heat exchanger 151 may heat exchange between the first refrigerant introduced through the bypass line 153 and the first refrigerant introduced through the first refrigerant line 11, and may bypass the first refrigerant of a gaseous state to the first compressor 17 through the bypass line 151.

Accordingly, a condensation amount of the first refrigerant may be increased.

Furthermore, the first refrigerant having the increased condensation amount may smoothly recover waste heat from the coolant supplied from the electrical component 7 in the chiller 25, improving heating performance and efficiency.

Meanwhile, the external air introduced from the outside thereof is dehumidified while passing through the first evaporator 15 supplied with the first refrigerant.

The external air which is dehumidified while passing through the first evaporator 15 is converted into a high-temperature state while passing through the heater 5, and is introduced into the vehicle interior, heating and dehumidifying the vehicle interior.

Accordingly, the heat pump system according to the exemplary embodiment may improve heating performance and efficiency while minimizing use of a separate electric heater, by use of thermal energy generated while the second refrigerant is phase-changed in the sub-CE module 30 together with the waste heat of the electrical component 7 in the low-temperature dehumidification mode.

Furthermore, it is possible to reduce power consumption of the first compressor 17, to maximize heating performance, and to supply the first refrigerant expanded to the first evaporator 15 to perform indoor dehumidification together, by facilitating the gas injection unit 50 to increase the flow rate of the first refrigerant.

Hereinafter, an operation depending on the high-temperature dehumidification mode of the vehicle according to various exemplary embodiments of the present invention will be described with reference to FIG. 10.

Figure 10:
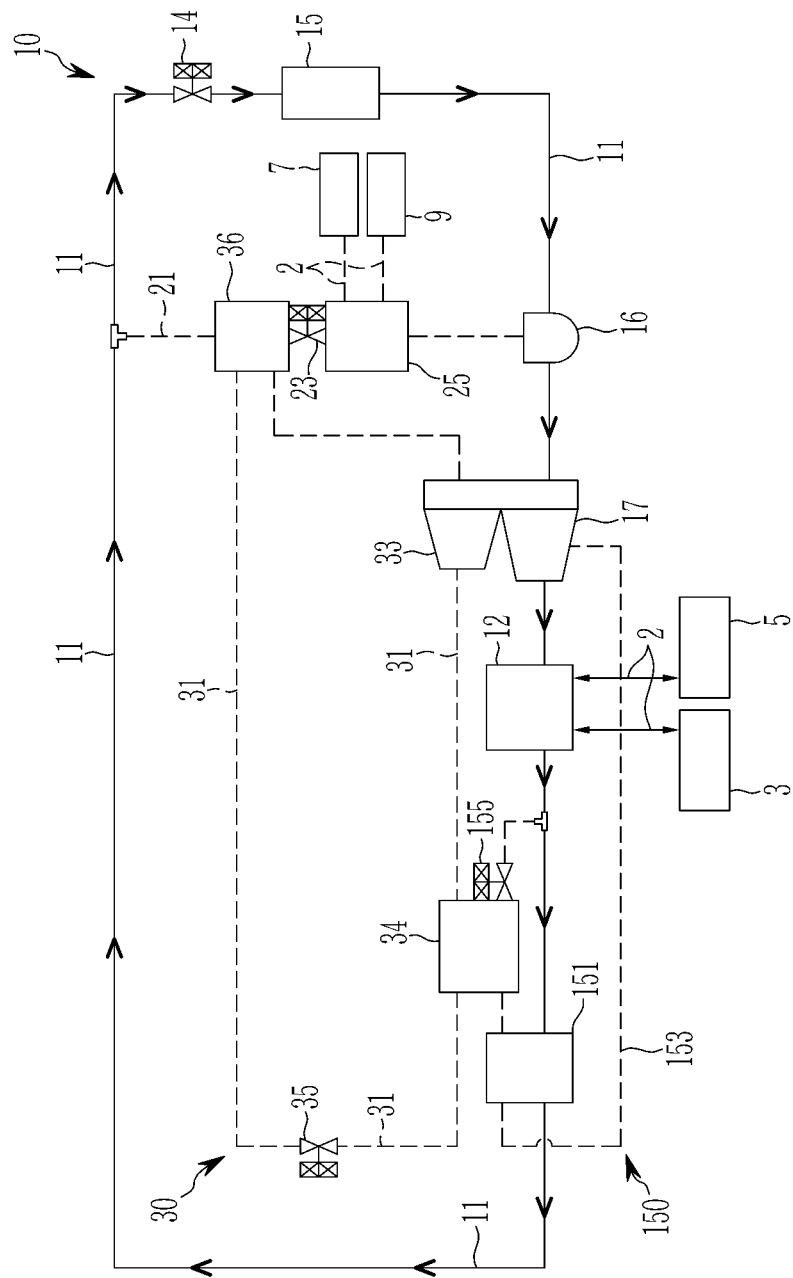
FIG. 10 illustrates an operational state diagram showing a high-temperature dehumidification mode of a heat pump system for a vehicle according to various exemplary embodiments of the present invention.

FIG. 10 illustrates an operational state diagram showing a high-temperature dehumidification mode of a heat pump system for a vehicle according to various exemplary embodiments of the present invention.

Herein, the high-temperature dehumidification mode is a mode which is operated when dehumidification is required in a vehicle interior in the cooling mode of the vehicle.

Referring to FIG. 10, in the air conditioner 10, each constituent element operates to cool an interior of the vehicle. Accordingly, the first refrigerant is circulated along the first refrigerant line 11.

Herein, the refrigerant connection line 21 is closed through operation of the second expansion valve 23.

Meanwhile, the coolant cooled by the radiator 3 is circulated in the first condenser 12 through the coolant line 2. Furthermore, the coolant line 2 connected to the heater 5 is closed.

That is, the coolant cooled by the radiator 3 may be supplied to the first condenser 12 through operation of a water pump.

Accordingly, the first condenser 12 condenses the first refrigerant supplied through the first refrigerant line 11 by use of the coolant flowing along the coolant line 2.

Furthermore, the coolant having a temperature which is increased while condensing the first refrigerant may be supplied to the heater 5 through the coolant line 2 connected to the heater 5.

Meanwhile, the first refrigerant passing through the first condenser 12 flows along the first refrigerant line 11.

The first refrigerant flowing along the first refrigerant line 11 is supplied to the first evaporator 15 through operation of the first expansion valve 14.

That is, the first refrigerant flows through the first refrigerant line 11 to cool the interior of the vehicle, and passes sequentially through the first expansion valve 14, the first evaporator 15, the accumulator 16, the first compressor 17, and the first condenser 12.

Herein, the external air introduced into the HVAC module is cooled while passing through the first evaporator 15 by the first refrigerant of a low temperature state introduced into the first evaporator 15.

The external air cooled while passing through the first evaporator 15 is dehumidified while passing through the heater 5 supplied with the high-temperature coolant from the first condenser 12 and introduced into the vehicle interior, cooling and dehumidifying the vehicle interior.

Meanwhile, the sub-CE module 30 and the gas injection unit 150 stop operating.

That is, depending on the high-temperature dehumidification mode of the vehicle, the interior of the vehicle may be cooled by use of the first refrigerant while repeating the above-described process, and internal dehumidification may be performed together by supplying the coolant whose temperature is increased through heat exchange with the first refrigerant in the first condenser 12 to the heater 5.

Therefore, as described above, when the vehicle heat pump system according to another exemplary embodiments of the present invention is applied, the chiller 25 in which the coolant and the first refrigerant are heat-exchanged is used to control the temperature of the battery module 9 according to the mode of the vehicle in the electric vehicle, simplifying the system.

Furthermore, according to various exemplary embodiments of the present invention, it is possible to reduce a total amount of refrigerant, and to improve heating performance and efficiency while minimizing use of electric heaters by use of the sub-CE module 30 together with the waste heat of the electrical component 7 in the heating mode of the vehicle.

Furthermore, according to various exemplary embodiments of the present invention, it is possible to reduce a manufacturing cost by configuring the second evaporator 36 applied to the sub-CE module 30 as a single unit which is detachably coupled to the chiller 25, and configuring the second compressor 33 integrally with the first compressor 17 applied to the air conditioner 10.

Furthermore, according to various exemplary embodiments of the present invention, it is possible to optimize the performance of the battery module 9 by efficiently controlling the temperature of the battery module 9, and to increase an overall travel distance of the vehicle through efficient management of the battery module 9.

Furthermore, according to various exemplary embodiments of the present invention, it is possible to reduce power consumption of the first compressor 17 and maximize heating performance by applying the gas injection unit 150 to increase the flow rate of the refrigerant.

Furthermore, according to various exemplary embodiments of the present invention, the entire system may be simplified to reduce manufacturing cost and weight, and to improve space utilization.

In various exemplary embodiments of the present invention, a controller is connected to at least one of the elements of the heat pump system such as the first, second and third expansion valves 14, 23, 57 or 155 and sub-expansion valve 35 but not limited thereto, to control the operations thereof.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data non-transitory storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A heat pump system for a vehicle, the heat pump system comprising:
   an air conditioner fluidically connected to a first refrigerant line through which a first refrigerant is circulated, and including a first condenser, a first expansion valve, a first evaporator, and a first compressor;
   a refrigerant connection line connecting a first portion of a first refrigerant line between the first condenser and the first evaporator and a second portion of the first refrigerant line between the first evaporator and the first compressor;
   a chiller provided on the refrigerant connection line, connected to an electrical component and a battery module through a coolant line, respectively, and heat-exchanging a coolant introduced in the chiller with the first refrigerant;
   a sub-centralized energy (CE) module including a second evaporator provided in the refrigerant connection line, fluidically connected to the air conditioner through the refrigerant connection line or the first refrigerant line, to adjust a temperature of the first refrigerant by selectively heat-exchanging thermal energy which is generated when condensing and evaporating of a second refrigerant circulating along a second refrigerant line with the first refrigerant; and
   a gas injection unit is provided in the air conditioner to increases a flow rate of the first refrigerant circulating in the first refrigerant line by bypassing a part of the first refrigerant to the first compressor in a heating mode or a low-temperature dehumidification mode of the vehicle,
   wherein the chiller and the second evaporator connected to each other in series on the refrigerant connection line are disposed in parallel with the first evaporator through the refrigerant connection line.

2. The heat pump system of claim 1, wherein the sub-CE module further includes:
   a second compressor configured to compress the second refrigerant;
   a second condenser connected to the second compressor through the second refrigerant line, and configured to condense the compressed second refrigerant supplied from the second compressor by heat-exchanging with the first refrigerant;
   a second expansion valve connected to the second condenser through the second refrigerant line and configured to expand the second refrigerant; and
   the second evaporator connected to the second expansion valve through the second refrigerant line, connected to the refrigerant connection line, and configured to evaporate the second refrigerant supplied from a sub-expansion valve by heat-exchanging with the first refrigerant introduced through the refrigerant connection line to supply the evaporated second refrigerant to the second compressor.

3. The heat pump system of claim 2,
   wherein the first condenser is detachably coupled to the second condenser and is provided in the first refrigerant line.

4. The heat pump system of claim 2,
   wherein the second evaporator is detachably coupled to the chiller and provided in the refrigerant connection line.

5. The heat pump system of claim 2,
   wherein the second compressor is integrally formed with the first compressor.

6. The heat pump system of claim 2,
   wherein a second expansion valve is provided between the chiller and the second evaporator to control a flow of the first refrigerant introducing into the chiller and to selectively expand the first refrigerant, and
   wherein the second expansion valve is detachably coupled to the chiller and the second evaporator between the chiller and the second evaporator.

7. The heat pump system of claim 6,
   wherein the second expansion valve expands the first refrigerant introduced into the refrigerant connection line when cooling the battery module by use of the coolant heat-exchanged with the first refrigerant to be introduced into the chiller.

8. The heat pump system of claim 6,
   wherein the first expansion valve, the second expansion valve, and the sub-expansion valve are each an electronic expansion valve that selectively expands a refrigerant while controlling a flow of the refrigerant.

9. The heat pump system of claim 2, wherein the gas injection unit includes:
   a flash tank provided in the first refrigerant line between the second condenser and the first expansion valve, and configured to separate the first refrigerant that has passed through the first and second condensers into a gaseous refrigerant and a liquid refrigerant and selectively discharge the gaseous refrigerant and the liquid refrigerant;
   a bypass line connecting the flash tank and the first compressor to selectively supply the first refrigerant of a gaseous state from the flash tank to the first compressor;
   a valve provided in the bypass line; and
   a third expansion valve provided between the first condenser and the second condenser and configured to selectively expand the first refrigerant.

10. The heat pump system of claim 9,
    wherein the third expansion valve expands the first refrigerant passing through the first condenser in the heating mode or the low-temperature dehumidification mode of the vehicle.

11. The heat pump system of claim 9,
    wherein the third expansion valve is detachably coupled to the first condenser and the second condenser.

12. The heat pump system of claim 2, wherein the gas injection unit includes:
    a plate heat exchanger provided in the first refrigerant line between the first condenser and the first expansion valve;
    a bypass line including a first end portion connected to the first refrigerant line between the first condenser and the plate heat exchanger and a second end portion connected to the first compressor through the second condenser and the plate heat exchanger; and
    a third expansion valve provided in the bypass line at a front end portion of the second condenser.

13. The heat pump system of claim 12,
    wherein the second condenser is provided in the bypass line between the first condenser and the plate heat exchanger, and wherein the third expansion valve expands the first refrigerant introducing into the bypass line through the first condenser in the heating mode or the low-temperature dehumidification mode of the vehicle.

14. The heat pump system of claim 2,
wherein the second compressor is formed to have a capacity smaller than a capacity of the first compressor.

15. The heat pump system of claim 1,
wherein the gas injection unit operates simultaneously with the sub-CE module in the heating mode or the low-temperature dehumidification mode of the vehicle.

16. The heat pump system of claim 1,
wherein the first condenser is connected to a radiator and a heater through a coolant line and condenses the first refrigerant by heat-exchanging with the coolant introduced therein with the first refrigerant.

17. The heat pump system of claim 16,
wherein the first condenser supplies a coolant having a temperature which is increased while condensing the first refrigerant in the heating mode, the low-temperature dehumidification mode, and a high-temperature dehumidification mode of the vehicle to the heater through the coolant line.

18. The heat pump system of claim 1,
wherein the chiller is connected to the electrical component and the battery module through the coolant line, respectively, and absorbs waste heat of the electrical component while heat-exchanging the coolant introduced in the chiller with the first refrigerant or supplies the coolant of a low temperature which undergoes heat transfer with the first refrigerant to the battery module.

19. The heat pump system of claim 1,
wherein the air conditioner further includes an accumulator provided in the first refrigerant line between the first evaporator and the first compressor, and
wherein the refrigerant connection line connects the first refrigerant line and the accumulator between the first condenser and the first expansion valve so that the first refrigerant passing through the chiller introduces into the first compressor via the accumulator.

20. The heat pump system of claim 1, wherein the first refrigerant and the second refrigerant are different refrigerants.

\* \* \* \* \*